United States Patent
Su et al.

(10) Patent No.: US 12,526,099 B2
(45) Date of Patent: Jan. 13, 2026

(54) METHOD AND APPARATUS FOR RANDOM ACCESS PROCEDURE

(71) Applicant: Telefonaktiebolaget LM Ericsson (publ), Stockholm (SE)

(72) Inventors: Ling Su, Beijing (CN); Johan Axnäs, Solna (SE); Robert Mark Harrison, Grapevine, TX (US); Zhipeng Lin, Nanjing Jiangsu (CN); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 18/014,294

(22) PCT Filed: Jul. 23, 2021

(86) PCT No.: PCT/CN2021/108211
§ 371 (c)(1),
(2) Date: Jan. 3, 2023

(87) PCT Pub. No.: WO2022/017511
PCT Pub. Date: Jan. 27, 2022

(65) Prior Publication Data
US 2023/0300891 A1   Sep. 21, 2023

(30) Foreign Application Priority Data

Jul. 24, 2020 (WO) ................ PCT/CN2020/104592

(51) Int. Cl.
*H04L 5/00* (2006.01)
*H04W 74/00* (2009.01)
(Continued)

(52) U.S. Cl.
CPC ......... *H04L 5/0048* (2013.01); *H04W 74/002* (2013.01); *H04W 74/0833* (2013.01); *H04W 74/0836* (2024.01)

(58) Field of Classification Search
CPC ........... H04W 74/0833; H04W 74/002; H04W 74/0836; H04L 5/0048
See application file for complete search history.

(56) References Cited

U.S. PATENT DOCUMENTS 6,865,377 B1 * 3/2005 Lindskog ............. H04B 7/0632
 375/299
2020/0059878 A1   2/2020 Huang et al.
(Continued)

FOREIGN PATENT DOCUMENTS

WO    2020019213 A1   1/2020

OTHER PUBLICATIONS

"Remaining details on RACH formats and configurations", 3GPP TSG RAN WG1 AH 1801, R1-1800897, Vancouver, Canada, Jan. 22-26, 2018, pp. 1-32.

*Primary Examiner* — Nizam U Ahmed
(74) *Attorney, Agent, or Firm* — Murphy, Bilak & Homiller, PLLC

(57) ABSTRACT

Embodiments of the present disclosure provide methods and apparatuses for random access procedure. A method performed by a terminal device comprises transmitting multiple preambles on different transmission chains of the terminal device to a network node. The multiple preambles are associated with a same or different synchronization signal and physical broadcast channel block (SSB).

18 Claims, 25 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2020/0383141 | A1* | 12/2020 | Lei | H04W 74/0833 |
| 2021/0298086 | A1* | 9/2021 | Jiang | H04W 74/0838 |
| 2022/0191948 | A1* | 6/2022 | Lei | H04L 5/0051 |

* cited by examiner

Four-step random access

Two-step random access

Transmission of multiple preambles using different Tx chains

Transmission options for UE with two transmit (Tx) antennas

Msg3 transmission based on beam correspondence

CB-based Msg3 transmission

Non CB-based Msg3 transmission

1700 ⟶

1702

Transmitting multiple preambles on different transmission chains of the terminal device to a network node, wherein the multiple preambles are associated with a same or different synchronization signal and physical broadcast channel block (SSB)

1704

Receiving a random access response for each of the multiple preambles, wherein random access response includes an identifier of a corresponding preamble and indicates to the terminal device to transmit a physical uplink shared channel (PUSCH

1706

Transmitting the PUSCH using a spatial domain transmission filter that it used to transmit the preamble corresponding to the identifier

Determining physical uplink shared channel (PUSCH) repetition in frequency domain

1804

Repeating the PUSCH in frequency domain

Indicating to the network node ability information for transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol, wherein a set of information bits of the PUSCH are mapped to a plurality of subbands and the plurality of subbands occupies a same Orthogonal Frequency-Division Multiple (OFDM) symbol

Determining physical uplink shared channel (PUSCH) repetition in spatial domain

1904

Repeating the PUSCH in spatial domain

Receiving ability information from a terminal device, wherein ability information indicates the terminal device transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol, wherein a set of information bits of the PUSCH are mapped to a plurality of subbands and the plurality of subbands occupies a same Orthogonal Frequency-Division Multiple (OFDM) symbol

Receiving physical uplink shared channel (PUSCH) repetition in spatial domain from a terminal device

FIG. 28

METHOD AND APPARATUS FOR RANDOM ACCESS PROCEDURE

TECHNICAL FIELD

The non-limiting and exemplary embodiments of the present disclosure generally relate to the technical field of communications, and specifically to methods and apparatuses for random access procedure.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication system such as NR (new radio), a random access procedure is needed for a user equipment (UE) to get access to the communication system. Before initiating random access procedure, UE needs to go through an initial synchronization process. For example, the UE needs to detect a synchronization signal (SS) such as Primary Synchronization Signals (PSSs) and Secondary Synchronization Signals (SSSs), etc. Then the UE decodes broadcasted system information. The next step is known as the random access procedure.

In NR, 2 types of random access procedures are supported. A message A (MsgA) physical uplink shared channel (PUSCH) transmission or a message 3 (Msg3) PUSCH transmission is used for transmission of radio resource control (RRC) setup request message in 2-step random access (RA) type and 4-step RA type respectively.

In a 4-step random access procedure as shown in FIG. 1, a UE detects a SS (such as NR-PSS and NR-SSS) and decodes the broadcasted system information (such as RMSI (Remaining Minimum System Information) and OSI (Other System Information)) (which may be distributed over multiple physical channels, e.g., Physical Broadcast Channel (PBCH) and Physical Downlink Shared Channel (PDSCH)) to acquire random access transmission parameters. The UE can transmit a NR physical random access channel (NR-PRACH) preamble (msg1) in an uplink (UL). The base station such as next generation NodeB (gNodeB or gNB) can reply with a NR Random Access Response (NR-RAR, msg2). The RAR may carry information such as temporary C-RNTI (cell radio network temporary identity); Timing Advance Value; and Uplink Grant Resource. The UE transmits NR PUSCH (message 3) after receiving a timing advance command in the RAR and after adjusting the timing of the PUSCH transmission, allowing PUSCH to be received at gNB with a timing accuracy within the cyclic prefix. Without this timing advance functionality, a very large Cyclic Prefix (CP) would be needed in order to be able to demodulate and detect PUSCH, unless the system is applied in a cell with very small distance between UE and gNB. Since NR may also support larger cells, there is a need for providing a timing advance to the UE and thus the 4-step approach is needed for random access procedure. The base station may respond with contention resolution message (CRM, msg4) to the UE.

For the 2-step random access procedure as shown in FIG. 2, the first step of detecting SSB (synchronization signal and physical broadcast channel block) and system information is same as in the 4-step random access procedure but then follows only two steps in order to minimize the number of channel accesses (which is important for e.g. operation in unlicensed frequency bands where listen before talk must be performed before transmission). Step 1: UE sends a message A (MsgA) including random access preamble together with higher layer data such as RRC connection request possibly with some small additional payload on PUSCH. Step 2: The gNB sends RAR (denoted message B or MsgB) including UE identifier assignment, timing advance information, and contention resolution message, etc.

Multi-TRP (Transmission and Reception Point) has been identified as one of the areas where further enhancements can be done for URLLC (Ultra-reliable and Low Latency Communications) by sending a same copy of data from multiple TRPs to a UE in downlink (DL). Multi-TRP URLLC schemes were introduced for PDSCH and FDM (Frequency Division Multiplex) was one of the schemes.

In FDM schemes 2a and 2b (will be described below), a TB (Transport Block) is transmitted over N TRPs (indicated by multiple TCI (Transmission Configuration Indication) states) within the single slot, with non-overlapped frequency resource allocation. Each non-overlapped frequency resource allocation is associated with one TCI state. Same single/multiple DMRS (Demodulation Reference Signal) port(s) are associated with all non-overlapped frequency resource allocations. FIG. 3 shows an example of resource allocation in FDM schemes with two TRPs. As shown in FIG. 3, total 8 RBs are allocated over 4 OFDM symbols and 4 RBs are allocated for each TRP.

FDM Scheme 2a:

Single codeword with one RV (redundancy version) is used across full resource allocation. From UE perspective, the common RB mapping (codeword to layer mapping) is applied across full resource allocation.

FIG. 4 shows an example of FDM scheme 2a with two TRPs. As shown in FIG. 4, one data layer is transmitted over each TRP on non-overlapping frequency resources. Since non-overlapping resources are allocated to the two TRPs, the same DMRS port can be configured for the two TRPs.

FDM Scheme 2b:

Single codeword with one RV is used for each non-overlapped frequency resource allocation. The RVs corresponding to each non-overlapped frequency resource allocation can be the same or different.

FIG. 5 shows an example of FDM scheme 2b with two TRPs. As shown in FIG. 5, 2 CWs (codewords) are generated for the same TB. One CW with RV1 is mapped to one layer in TRP1 while the other CW with RV2 is mapped to another layer in TRP2. As a result, for the same given time-frequency resource, the code rate for FDM scheme 2b would be doubled compared to FDM scheme 2a. Since non-overlapping resources are allocated to the two TRPs, the same DMRS port can be configured for the two TRPs.

NR UE Coherence Capability

Two UL MIMO (Multiple Input Multiple Output) transmission schemes were included in NR: codebook-based UL transmission and non-codebook-based UL transmission. In addition, the notion of UE coherence capability was introduced for codebook-based UL transmission. The reason for this is that precoding in UL requires that UE Tx (transmission) chains have stable relative phase to enable array gain, which can be difficult due to, e.g. that the phase can vary with Tx power in multi-stage PA (Power Amplifier) architectures (e.g. Doherty PA) or Tx chains may not all share the same local oscillator.

NR may support 3 levels of UE capability for UL MIMO transmission as shown in FIG. 6:

Full coherence: All ports can be transmitted coherently
For example, All SRS (Sounding Reference Signal) ports are assumed to have well controlled relative phase
Partial coherence: Port pairs can be transmitted coherently
For example, SRS port pairs {0,2} and {1,3} are assumed to have well controlled relative phase
Non-coherence: No port pairs can be transmitted coherently
For example, no SRS ports are assumed to have well controlled relative phase Depending on which UE coherence capability the UE has, different subsets of the UL codebook are available. FIG. 7 illustrates the different subset codebook for rank 1 precoders, where a fully coherent UE can be configured with all three subsets, a partially coherent UE can be configured with Non-coherent and Partial-coherent subsets, and non-coherent UEs can be configured with Non-coherent subset.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems for existing random access procedure. For example, due to lack of early beam information and no support of repetitions, Msg1 preamble, Msg3 PUSCH and MsgA PUSCH could be a potential coverage performance bottleneck channel. Therefore the transmission of Msg1 preamble, Msg3 PUSCH and MsgA PUSCH needs to be improved.

To overcome or mitigate the above mentioned problem or other problems, some embodiments of the present disclosure propose an improved random access procedure.

In a first aspect of the disclosure, there is provided a method performed by a terminal device. The method comprises transmitting multiple preambles on different transmission chains of the terminal device to a network node. The multiple preambles are associated with a same or different synchronization signal and physical broadcast channel block (SSB).

In an embodiment, the multiple preambles are the preambles mapping to a best SSB in different directions.

In an embodiment, the multiple preambles are simultaneously transmitted in a same random access channel occasion (RO) or are transmitted in different time division multiplexed ROs or are simultaneously transmitted in different frequency division multiplexed ROs.

In an embodiment, when the multiple preambles are associated with the same SSB,
when one SSB maps to one RO, the multiple preambles are transmitted in the same RO, and
when one SSB maps to multiple frequency division multiplexed ROs, the multiple preambles are transmitted in a same RO or different ROs.

In an embodiment, when the multiple preambles are associated with different SSBs,
when the different SSBs map to a same RO, the multiple preambles are transmitted in the same RO, and
when the different SSBs map to multiple frequency division multiplexed ROs, the multiple preambles are transmitted in the multiple frequency division multiplexed ROs.

In an embodiment, when a coherent closed loop transmit diversity is used, the multiple preambles are simultaneously transmitted in the same RO.

In an embodiment, when an open loop transmit diversity or a non coherent closed loop transmit diversity is used, the multiple preambles are simultaneously transmitted in different frequency division multiplexed ROs.

In an embodiment, the multiple preambles are transmitted at a same power level.

In an embodiment, each of the multiple preambles is transmitted using a different spatial domain transmission filter.

In an embodiment, the multiple preambles contain the preambles when a channel quality measure (such as signal quality or signal level. e.g. RSRP, measured on SSB or CSI-RS) is greater than a threshold.

In an embodiment, a set of random access channel occasions (ROs) is configured for transmission of a same preamble and each set of ROs corresponds to a different transmission chain of the terminal device.

In an embodiment, a preamble is configured with at least two preamble identifiers (IDs) and each preamble identifier ID corresponds to a different transmission chain of the terminal device.

In an embodiment, a set of scrambling sequences are able to be used for scrambling each preamble and each scrambling sequence corresponds to a different transmission chain of the terminal device.

In an embodiment, the multiple preambles are determined based on at least one of:
a preamble group in one RO;
different ROs; or
different coherency capability.

In an embodiment, a number of consecutive preambles are grouped for a terminal device requiring the number of consecutive preambles to transmit.

In an embodiment, the preambles are divided for a non-coherent terminal device, a partially coherent terminal device and a fully coherent terminal device.

In an embodiment, a preamble index from every RO is reserved by System Information Block Type 1 (SIB1) for a terminal device.

In an embodiment, there is a mapping between the preambles and virtual antenna ports of the terminal device.

In an embodiment, the method further comprises receiving a random access response that includes an identifier of any or a particular preamble in the multiple preambles and indicates to the terminal device to transmit a physical uplink shared channel (PUSCH). The method further comprises transmitting the PUSCH using a spatial domain transmission filter that it used to transmit the preamble corresponding to the identifier. The method further comprises continuing to use the spatial domain transmission filter for subsequent transmission of the PUSCH.

In an embodiment, the method further comprises receiving a random access response for each of the multiple preambles, wherein random access response includes an identifier of a corresponding preamble and indicates to the terminal device to transmit a physical uplink shared channel (PUSCH). The method further comprises transmitting the PUSCH using a spatial domain transmission filter that it used to transmit the preamble corresponding to the identifier.

In an embodiment, the random access response further includes a precoder that the terminal device uses for PUSCH transmission.

In an embodiment, when the precoder is absent in the random access response, the PUSCH is transmitted from only one antenna port which has transmitted the preamble corresponding to the identifier.

In an embodiment, a number of PUSCH layers is indicated in the random access response to support multiple-layer PUSCH transmission.

In an embodiment, when repetition is configured for PUSCH, one or more precoders included in the random access response are used for all PUSCH repetitions.

In an embodiment, the precoder for PUSCH is configured in System Information Block Type 1 (SIB1) or predefined.

In an embodiment, the precoder included in the random access response are used for subsequent PUSCH transmissions.

In an embodiment, the preamble and the PUSCH are transmitted together as a message A in a two-step random access procedure or the preamble and the PUSCH are transmitted as a message 1 and message 3 respectively in a four-step random access procedure.

In a second aspect of the disclosure, there is provided a method performed by a terminal device. The method comprises determining physical uplink shared channel (PUSCH) repetition in frequency domain. The method further comprises repeating the PUSCH in frequency domain.

In an embodiment, multiple frequency domain PUSCH repetitions are triggered by one or more random access responses and have same or different redundancy versions, modulation coding schemes and precoders.

In an embodiment, the PUSCH is repeated in multiple frequency domain repetitions in each Orthogonal Frequency-Division Multiple (OFDM) symbol and each PUSCH repetition is transmitted by a distinct antenna port.

In an embodiment, each PUSCH repetition contains contiguous physical resource blocks and a gap in frequency domain between multiple PUSCH repetitions is configured or predefined.

In an embodiment, each PUSCH repetition uses intra-slot hopping.

In a third aspect of the disclosure, there is provided a method performed by a terminal device. The method comprises, indicating to the network node ability information for transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol, wherein a set of information bits of the PUSCH are mapped to a plurality of subbands and the plurality of subbands occupies a same Orthogonal Frequency-Division Multiple (OFDM) symbol.

In an embodiment, each of the plurality of subbands is identified by a distinct DMRS port.

In an embodiment, each of the plurality of subbands is associated with a same antenna port and the plurality of subbands are separated by a fixed distance.

In an embodiment, an entirety of information bits of the PUSCH are mapped to each of the plurality of subbands, the random access response includes an identifier for a corresponding preamble, the PUSCH is transmitted in a subband of the plurality of subbands according to the random access response.

In an embodiment, the PUSCH is a message A PUSCH in a two-step random access procedure or the PUSCH is message 3 in a four-step random access procedure.

In a fourth aspect of the disclosure, there is provided a method performed by a terminal device. The method comprises determining physical uplink shared channel (PUSCH) repetition in spatial domain. The method further comprises repeating the PUSCH in spatial domain.

In an embodiment, each PUSCH repetition is transmitted by a distinct layer.

In an embodiment, a number of PUSCH spatial domain repetitions equals to the number of layers.

In an embodiment, the PUSCH spatial domain repetition is used together with one or more of following:
  intra-slot hopping;
  frequency domain repetition; or
  time domain repetition.

In an embodiment, the PUSCH repetition in spatial domain is indicated to the terminal device by one of medium access control control element (MAC CE), radio resource control (RRC) message, a random access response (RAR) or downlink control information (DCI) or layer 1 signalling.

In an embodiment, the PUSCH is a message A PUSCH in a two-step random access procedure or the PUSCH is message 3 in a four-step random access procedure.

In a fifth aspect of the disclosure, there is provided a method performed by a terminal device. The method comprises determining to use a closed-loop transmit diversity or an open-loop transmit diversity. The method further comprises transmitting the PUSCH to the network node based on the determination.

In an embodiment, determining to use a closed-loop transmit diversity or an open-loop transmit diversity comprises: receiving a first flag from the network node, wherein the flag indicates whether the closed-loop transmit diversity or the open-loop transmit diversity is used; and determining to use the closed-loop transmit diversity or the open-loop transmit diversity based on the first flag.

In an embodiment, the first flag is included in at least one of radio resource control (RRC) message or a random access response (RAR) or downlink control information (DCI).

In an embodiment, determining to use a closed-loop transmit diversity or an open-loop transmit diversity comprises: when the PUSCH is a massage A PUSCH of a two-step random access procedure, determining to use the open-loop transmit diversity; and when no closed-loop transmit diversity is configured, determining whether to use the open-loop transmit diversity.

In an embodiment, the method further comprises receiving a second flag from the network node, wherein the second flag indicates whether PUSCH repetition is applied together with the transmit diversity.

In an embodiment, the method further comprises applying the PUSCH repetition based on the second flag.

In an embodiment, when the PUSCH repetition is applied, different PUSCH repetitions use different precoders or antenna hopping.

In an embodiment, the method further comprises receiving a PUSCH repetition configuration from the network node, wherein the PUSCH repetition configuration configures multiple consecutive PUSCH repetitions and for each of the multiple consecutive PUSCH repetitions, a same precoder or antenna hopping is used.

In an embodiment, the method further comprises transmitting the PUSCH repetition to the network node based on the PUSCH repetition configuration.

In an embodiment, the method further comprises choosing a precoder or antenna hopping based on factors including a number of transmit antennas and coherency capability.

In an embodiment, the method further comprises determining how many PUSCH repetitions use the same precoder or antenna hopping.

In an embodiment, the PUSCH is transmitted over N PUSCH repetitions, M consecutive PUSCH repetitions of N PUSCH repetitions are transmitted using a first precoder of the sequence of precoders and at least one PUSCH repetition following the M consecutive PUSCH repetitions of the N PUSCH repetitions is transmitted using a second precoder of the sequence of precoders, wherein M and N are positive integers and M is smaller than N.

In an embodiment, a different redundancy version is used between PUSCH repetitions sharing a precoder.

In an embodiment, determining to use a closed-loop transmit diversity or an open-loop transmit diversity comprising: determining to use the open-loop transmit diversity within coherency capability of the terminal device.

In an embodiment, precoder cycling and/or antenna hopping is used within a PUSCH repetition and the PUSCH on different subset of Orthogonal Frequency-Division Multiple (OFDM) symbols uses different precoders and/or antennas.

In an embodiment, precoder cycling and/or antenna hopping is performed so that a same precoder and/or transmit antenna is not used for two PUSCH repetitions that use a same Hybrid Automatic Repeat request (HARQ) redundancy version.

In an embodiment, the PUSCH is a message A PUSCH in a two-step random access procedure or the PUSCH is message 3 in a four-step random access procedure.

In a sixth aspect of the disclosure, there is provided a method performed by a terminal device. The method comprises refining a preamble beam and/or a PUSCH beam based on a received SSB beam and/or an early Channel State Information Reference Signal beam before or during a random access process.

In an embodiment, a best SSB beam is used as a reference for the preamble transmission and/or the PUSCH transmission during the random access.

In an embodiment, a best early CSI-RS beam is used as a reference for the preamble transmission and/or the PUSCH transmission during the random access.

In an embodiment, there is a mapping between Sounding Reference Signal (SRS) resources to physical random access channel (PRACH) resource.

In an embodiment, the SRS resources includes at least one of time domain resources, frequency domain resources, spatial domain resources, sequence, cyclic shift, or ports and the PRACH resource includes at least one of PRACH sequence identifier, time domain resources, frequency domain resources, or spatial domain resources.

In an embodiment, the SRS resources used during random access procedure is configured by System Information Block Type 1 (SIB1).

In an embodiment, separate time resources and/or frequency resources are reserved for SRS with different number of ports.

In an embodiment, the method further comprises transmitting multiple non-precoded SRS resources to the network node according to SRS configuration in SIB1.

In an embodiment, the method further comprises receiving a random access response indicating one SRS resource and precoder from the network node. The PUSCH is transmitted in a direction of the one SRS resource.

In an embodiment, the method further comprises receiving cell-specific Channel State Information Reference Signal (CSI-RS) from the network node.

In an embodiment, the method further comprises transmitting beamformed SRS beams to the network node based on reciprocity in System Information Block Type 1 (SIB1) configured time and/or frequency resources;

In an embodiment, the method further comprises receiving a strongest SRS resource ID from the network node. The PUSCH is transmitted in a direction of a SRS resource indicated by the strongest SRS resource ID with precoder.

In an embodiment, the preamble and the PUSCH are transmitted together as a message A in a two-step random access procedure or the preamble and the PUSCH are transmitted as a message 1 and message 3 respectively in a four-step random access procedure.

In a seventh aspect of the disclosure, there is provided a method performed by a network node. The method comprises receives multiple preambles from a terminal device, wherein the multiple preambles are associated with a same or different synchronization signal and physical broadcast channel block (SSB).

In an embodiment, the method further comprises transmitting a random access response to the terminal device, wherein the random access response includes an identifier of any or a particular preamble in the multiple preambles and indicates to the terminal device to transmit a physical uplink shared channel (PUSCH).

In an embodiment, the method further comprises receiving the PUSCH from the terminal device, wherein the PUSCH is transmitted using a spatial domain transmission filter that it used to transmit the preamble corresponding to the identifier.

In an embodiment, the method further comprises receiving multiple preambles from a terminal device, wherein the multiple preambles are associated with a same or different synchronization signal and physical broadcast channel block (SSB).

In an embodiment, the method further comprises transmitting a random access response for each of the multiple preambles to the terminal device, wherein the random access response includes an identifier of a corresponding preamble and indicates to the terminal device to transmit a physical uplink shared channel (PUSCH).

In an embodiment, the method further comprising receives the PUSCH from the terminal device, wherein the PUSCH is transmitted using a spatial domain transmission filter that it used to transmit the preamble corresponding to the identifier.

In an eighth aspect of the disclosure, there is provided a method performed by a network node. The method comprises receiving physical uplink shared channel (PUSCH) repetition in frequency domain from a terminal device.

In a ninth aspect of the disclosure, there is provided a method performed by a network node. The method comprises receiving ability information from a terminal device. The ability information indicates the terminal device transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol.

In a tenth aspect of the disclosure, there is provided a method performed by a network node. The method comprises receiving physical uplink shared channel (PUSCH) repetition in spatial domain from a terminal device.

In an embodiment, the method further comprises transmitting a first flag to the terminal device, wherein the flag indicates whether the closed-loop transmit diversity or the open-loop transmit diversity is used.

In an embodiment, the method further comprises transmitting a second flag to the terminal device. The second flag indicates whether PUSCH repetition is applied together with the transmit diversity.

In an eleventh aspect of the disclosure, there is provided a method performed by a network node. The method comprises receiving a physical uplink shared channel (PUSCH) from a terminal device, wherein the PUSCH is transmitted based on a closed-loop transmit diversity or an open-loop transmit diversity.

In an embodiment, the method further comprises transmitting a PUSCH repetition configuration to the terminal device, wherein the PUSCH repetition configuration configures multiple consecutive PUSCH repetitions and for each of the multiple consecutive PUSCH repetitions, a same precoder or antenna hopping is used.

In an embodiment, the method further comprises receiving the PUSCH repetition from the terminal device based on the PUSCH repetition configuration.

In a twelfth aspect of the disclosure, there is provided a method performed by a network node. The method comprises receiving a preamble beam and/or a PUSCH beam from a terminal device, wherein the preamble beam and/or the PUSCH beam is refined based on a received SSB beam and/or an early Channel State Information Reference Signal beam before or during a random access process.

In an embodiment, the method further comprises receiving multiple non-precoded SRS resources from the terminal device according to SRS configuration in SIB1.

In an embodiment, the method further comprises transmitting a random access response indicating one SRS resource and precoder to the terminal device.

In an embodiment, the method further comprises transmitting cell-specific Channel State Information Reference Signal (CSI-RS) to the terminal device.

In an embodiment, the method further comprises receiving beamformed SRS beams from the terminal device, wherein the beamformed SRS beams is transmitted based on reciprocity in System Information Block Type 1 (SIB1) configured time and/or frequency resources.

In an embodiment, the method further comprises transmitting a strongest SRS resource ID to the terminal device. The PUSCH is transmitted in a direction of a SRS resource indicated by the strongest SRS resource ID with precoder.

In another aspect of the disclosure, there is provided a terminal device. The terminal device comprises a processor; and a memory coupled to the processor, said memory containing instructions executable by said processor, whereby said terminal device is operative to transmit multiple preambles on different transmission chains of the terminal device to a network node, wherein the multiple preambles are associated with a same or different synchronization signal and physical broadcast channel block (SSB).

In another aspect of the disclosure, there is provided a terminal device. The terminal device comprises a processor; and a memory coupled to the processor, said memory containing instructions executable by said processor, whereby said terminal device is operative to determine physical uplink shared channel (PUSCH) repetition in frequency domain. Said terminal device is further operative to and repeat the PUSCH in frequency domain.

In another aspect of the disclosure, there is provided a terminal device. The terminal device comprises a processor; and a memory coupled to the processor, said memory containing instructions executable by said processor, whereby said terminal device is operative to indicate to the network node ability information for transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol, wherein a set of information bits of the PUSCH are mapped to a plurality of subbands and the plurality of subbands occupies a same Orthogonal Frequency-Division Multiple (OFDM) symbol.

In another aspect of the disclosure, there is provided a terminal device. The terminal device comprises a processor and a memory coupled to the processor. Said memory contains instructions executable by said processor. Said terminal device is operative to determine physical uplink shared channel (PUSCH) repetition in spatial domain. Said terminal device is further operative to repeat the PUSCH in spatial domain.

In another aspect of the disclosure, there is provided a terminal device. The terminal device comprises a processor and a memory coupled to the processor. Said memory contains instructions executable by said processor. Said terminal device is operative to determine to use a closed-loop transmit diversity or an open-loop transmit diversity. Said terminal device is further operative to transmit the PUSCH to the network node based on the determination.

In another aspect of the disclosure, there is provided a terminal device. The terminal device comprises a processor and a memory coupled to the processor. Said memory contains instructions executable by said processor. Said terminal device is operative to refine a preamble beam and/or a PUSCH beam based on a received SSB beam and/or an early Channel State Information Reference Signal beam before or during a random access process.

In another aspect of the disclosure, there is provided a network node. The network node comprises a processor and a memory coupled to the processor. Said memory contains instructions executable by said processor. Said network node is operative to receive multiple preambles from a terminal device, wherein the multiple preambles are associated with a same or different synchronization signal and physical broadcast channel block (SSB).

In another aspect of the disclosure, there is provided a network node. The network node comprises a processor and a memory coupled to the processor. Said memory contains instructions executable by said processor. Said network node is operative to receive physical uplink shared channel (PUSCH) repetition in frequency domain from a terminal device.

In another aspect of the disclosure, there is provided a network node. The network node comprises a processor and a memory coupled to the processor. Said memory contains instructions executable by said processor. Said network node is operative to receive physical uplink shared channel (PUSCH) repetition in spatial domain from a terminal device.

In another aspect of the disclosure, there is provided a network node. The network node comprises a processor and a memory coupled to the processor. Said memory contains instructions executable by said processor. Said network node is operative to receive a physical uplink shared channel (PUSCH) from a terminal device, wherein the PUSCH is transmitted based on a closed-loop transmit diversity or an open-loop transmit diversity.

In another aspect of the disclosure, there is provided a network node. The network node comprises a processor and a memory coupled to the processor. Said memory contains instructions executable by said processor. Said network node is operative to receive ability information from a terminal device, wherein ability information indicates the terminal device transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol, wherein a set of information bits of the PUSCH are mapped to a plurality of subbands and the plurality of subbands occupies a same Orthogonal Frequency-Division Multiple (OFDM) symbol.

In another aspect of the disclosure, there is provided a network node. The network node comprises a processor and a memory coupled to the processor. Said memory contains instructions executable by said processor. Said network node is operative to receive a preamble beam and/or a PUSCH beam from a terminal device, wherein the preamble beam and/or the PUSCH beam is refined based on a received SSB beam and/or an early Channel State Information Reference Signal beam before or during a random access process.

In another aspect of the disclosure, there is provided a computer program product, comprising instructions which, when executed on at least one processor, cause the at least one processor to carry out the method according to any of the above first to twelfth aspects.

In another aspect of the disclosure, there is provided a computer-readable storage medium storing instructions which when executed by at least one processor, cause the at least one processor to carry out the method according to any of the above first to twelfth aspects.

Another aspect of the present disclosure provides a communication system including a host computer including: processing circuitry configured to provide user data; and a communication interface configured to forward the user data to a cellular network for transmission to a terminal device. The cellular network includes a network node above mentioned, and/or the terminal device is above mentioned.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

Another aspect of the present disclosure provides a communication system including a host computer including: a communication interface configured to receive user data originating from a transmission from a terminal device; a network node. The transmission is from the terminal device to the network node. The network node is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Another aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node which may perform any step of the methods according to the seventh to twelfth aspects.

Another aspect of the present disclosure provides a communication system including a host computer. The host computer may comprise processing circuitry configured to provide user data, and a communication interface configured to forward the user data to a cellular network for transmission to a UE. The cellular network may comprise a network node having a radio interface and processing circuitry. The network node's processing circuitry may be configured to perform any step of the methods according to the seventh to twelfth aspects.

Another aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node. The UE may perform any step of the methods according to the first to sixth aspects.

Another aspect of the present disclosure provides a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the methods according to the first to sixth aspects.

Another aspect of the present disclosure provides a method implemented in a communication system which may include a host computer, a network node and a UE. The method may comprise, at the host computer, receiving user data transmitted to the network node from the UE which may perform any step of the methods according to the first to sixth aspects.

Another aspect of the present disclosure provides a communication system including a host computer. The host computer may comprise a communication interface configured to receive user data originating from a transmission from a UE to a network node. The UE may comprise a radio interface and processing circuitry. The UE's processing circuitry may be configured to perform any step of the methods according to the first to sixth aspects.

Another aspect of the present disclosure provides a method implemented in a communication system which may include a host computer, a network node and a UE. The method may comprise, at the host computer, receiving, from the network node, user data originating from a transmission which the network node has received from the UE. The network node may perform any step of the methods according to the seventh to twelfth aspects.

Another aspect of the present disclosure provides a communication system which may include a host computer. The host computer may comprise a communication interface configured to receive user data originating from a transmission from a UE to a network node. The network node may comprise a radio interface and processing circuitry. The network node's processing circuitry may be configured to perform any step of the methods according to the seventh to twelfth aspects.

Embodiments herein afford many advantages, of which a non-exhaustive list of examples follows. Some embodiments herein may improve uplink channel coverage performance during the random access procedure in a resource efficient manner, which thereby improves the whole network (such as NR) performance. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 17 shows a flowchart of a method according to an embodiment of the present disclosure;

FIG. 18a shows a flowchart of a method according to an embodiment of the present disclosure;

FIG. 18b shows a flowchart of a method according to an embodiment of the present disclosure;

FIG. 19 shows a flowchart of a method according to an embodiment of the present disclosure;

FIG. 27b shows a flowchart of a method according to an embodiment of the present disclosure;

FIG. 28 shows a flowchart of a method according to an embodiment of the present disclosure;

DETAILED DESCRIPTION

Figure 1:
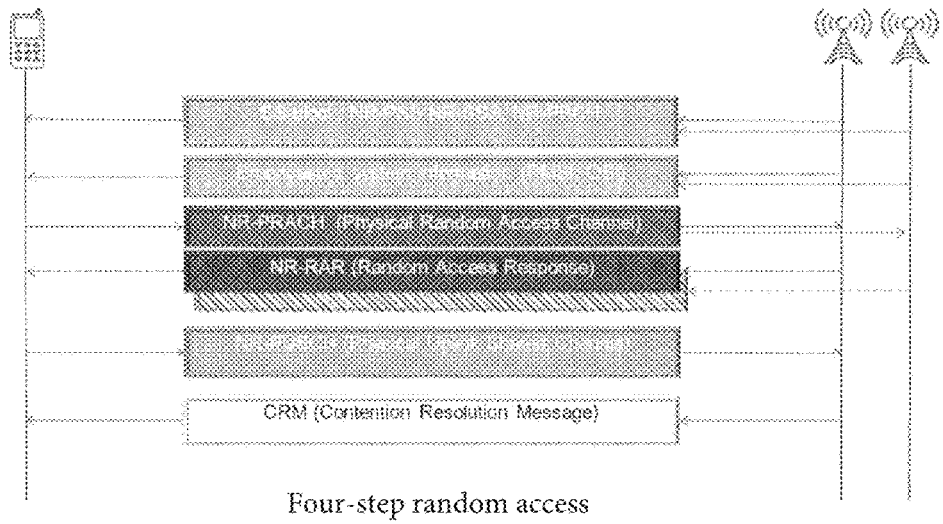
FIG. 1 shows a flowchart of a 4-step random access procedure.
Figure 2:
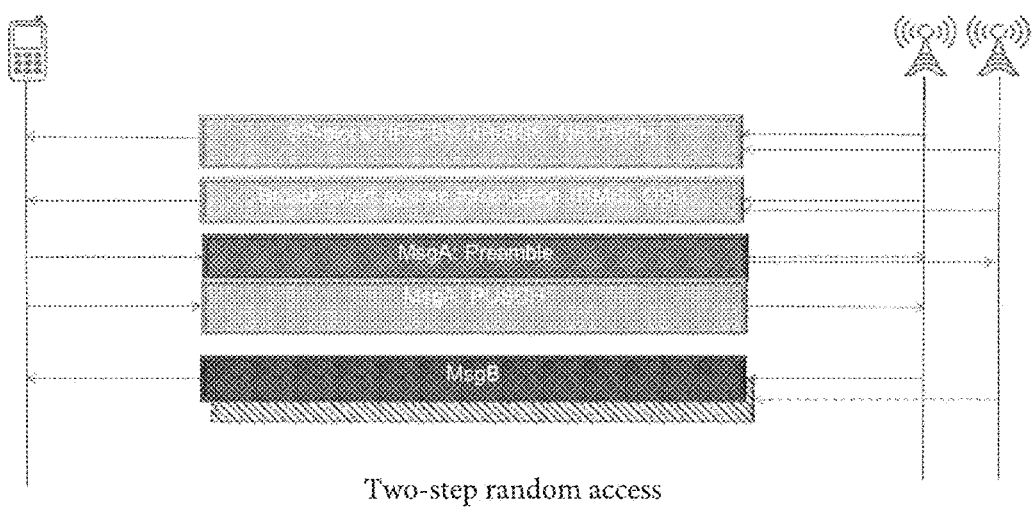
FIG. 2 shows a flowchart of a 2-step random access procedure.
Figure 3:
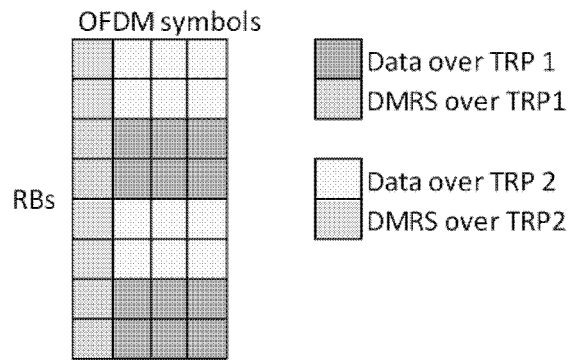
FIG. 3 shows an example of resource allocation in FDM schemes with two TRPs.
Figure 4:
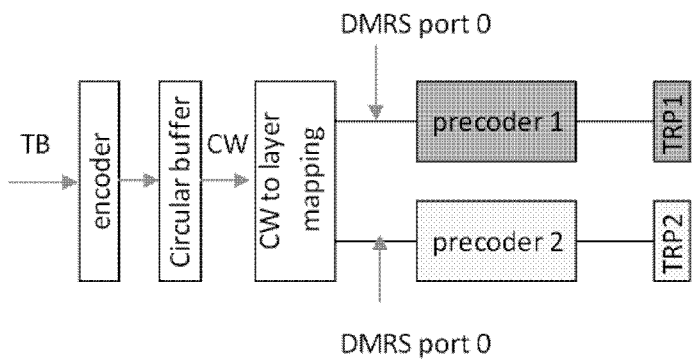
FIG. 4 shows an example of FDM scheme 2a with two TRPs.
Figure 5:
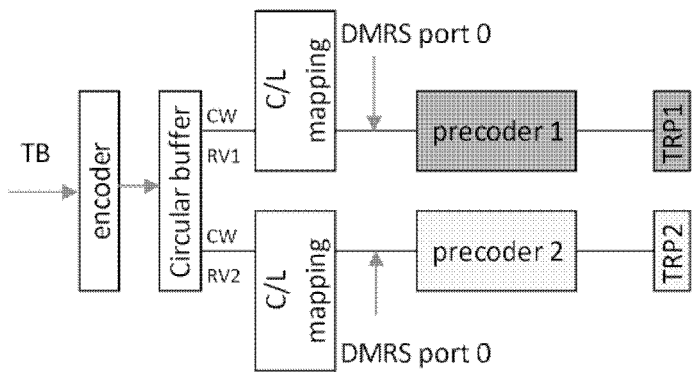
FIG. 5 shows an example of FDM scheme 2b with two TRPs.
Figure 6:
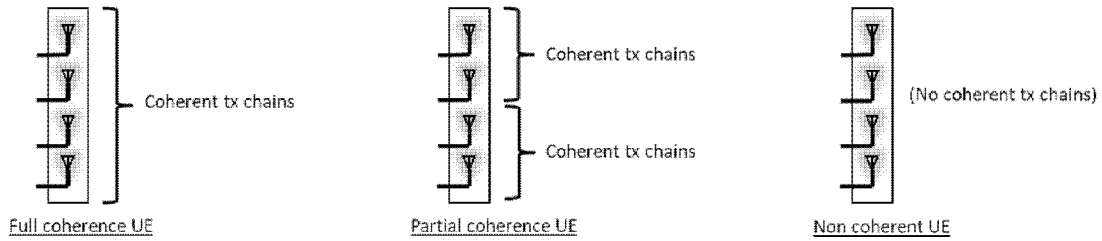
FIG. 6 shows 3 levels of UE capability for UL MIMO transmission.
Figure 7:
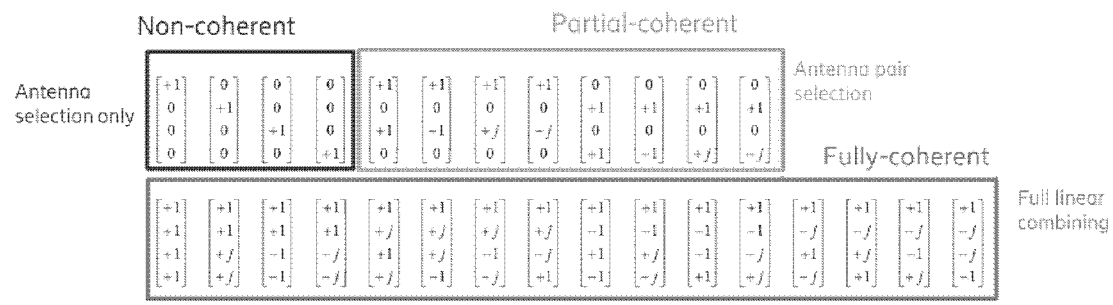
FIG. 7 illustrates the different subset codebook for rank 1 precoders.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3rd Generation Partnership Project (3GPP). For example, the communication protocols as may comprise the first generation (1G), 2G, 3G, 4G, 4.5G, 5G communication protocols, and/or any other protocols either currently known or to be developed in the future.

The term "network node" as used herein refers to a network device or a network entity (physical or virtual) in a communication network. For example, the network node may be an access network device in a communication network via which a terminal device accesses to the network and receives services therefrom. For example, the network node may comprise, but not limited to, a base station (BS), an Integrated Access and Backhaul (IAB) node, an access point, a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Figure 8:
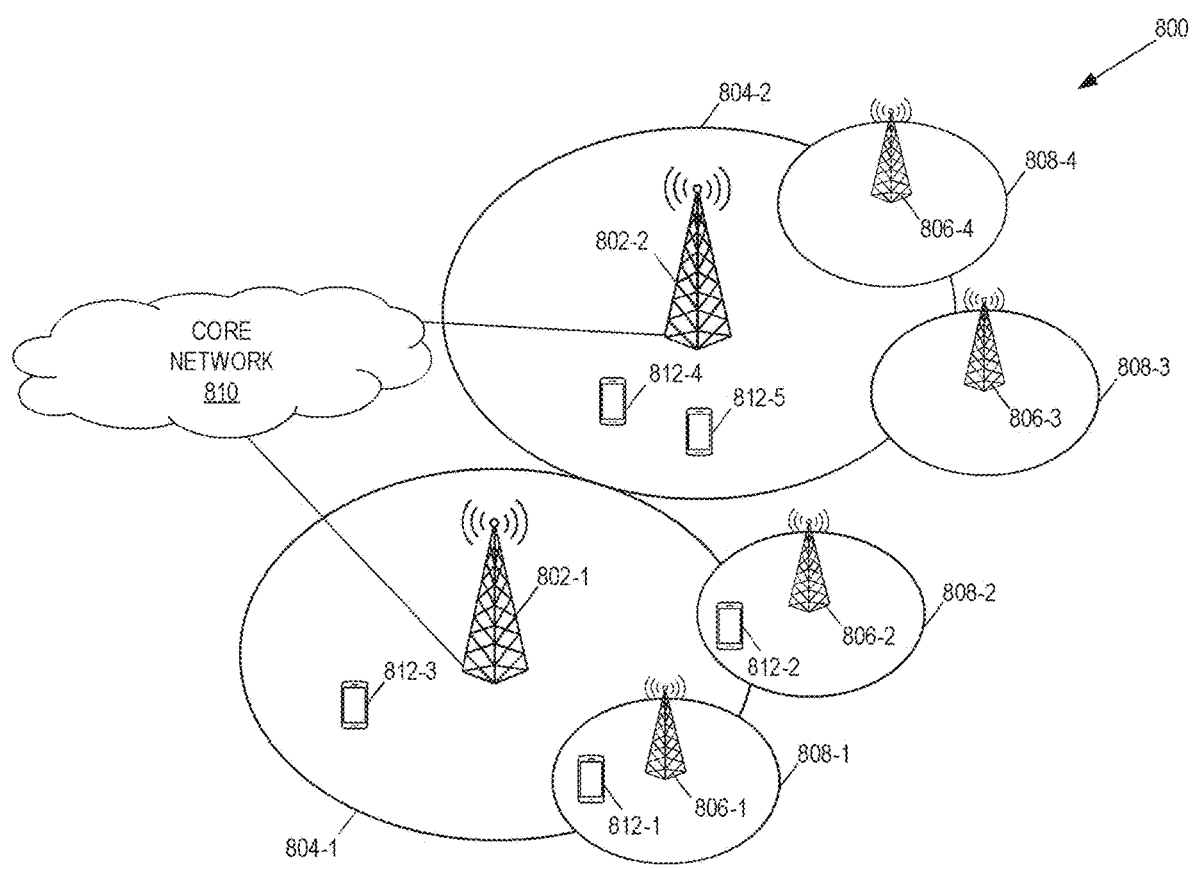
FIG. 8 depicts a schematic system, in which some embodiments of the present disclosure can be implemented.

FIG. 8 depicts a schematic system, in which some embodiments of the present disclosure can be implemented. In the embodiments described herein, the cellular communications system 800 may be a 5G System (5GS) including a Next Generation RAN (NG-RAN) and a 5G Core (5GC) or a LTE system including a RAN and an EPC. In this example, the RAN includes base stations 802-1 and 802-2, which in the 5GS include NR base stations (gNBs) and optionally next generation eNBs (ng-eNBs) (i.e., LTE RAN nodes connected to the 5GC), controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The RAN may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The cellular communications system 800 also includes a core network 810, which in the 5GS is referred to as the 5G Core (5GC) and in the LTE is referred to as EPC. The base stations 802 (and optionally the low power nodes 806) are connected to the core network 810.

The base stations 802 and the low power nodes 806 provide service to wireless communication devices 812-1 through 812-5 in the corresponding cells 804 and 808. The wireless communication devices 812-1 through 812-5 are generally referred to herein collectively as wireless communication devices 812 and individually as wireless communication device 812. In the following description, the wireless communication devices 812 are oftentimes UEs, but the present disclosure is not limited thereto.

Preamble Enhancement

Figure 9:
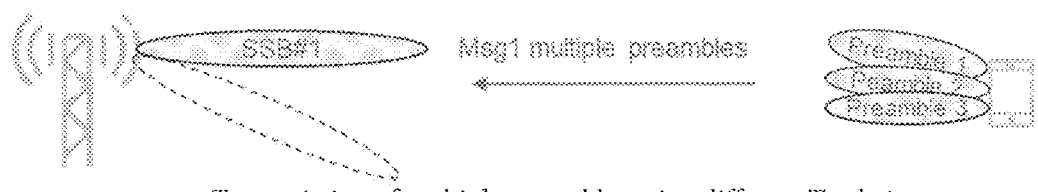
FIG. 9 shows an example of UE transmitting multiples preambles to the network node according to an embodiment of the present disclosure.

To improve robustness of preamble, a UE may send multiples preambles and network node (such as BS) may respond with one or multiple RAR for each UE. FIG. 9 shows an example of UE transmitting multiples preambles to the network node according to an embodiment of the present disclosure.

In an embodiment, the UE may transmit PRACH preambles on different TX chains of the UE. The multiple preambles can be associated with the same or different SSB.

For example, a UE with two Tx chains can transmit two PRACH preambles in different directions, wherein the two PRACH preambles map to the best SSB and the different directions are within the associated SSB beam. A benefit of using preambles associated with a same SSB is that the embodiment can operate if a few SSBs or one SSB is configured for a cell, facilitating low PRACH overhead and fewer SSB measurements per cell. When preambles are associated with different SSBs, a UE with two Tx chains can have one Tx chain transmit a preamble associated with the best SSB beam and another Tx chain transmit a preamble associated with the 2nd best SSB beam. If the different SSBs are mapped to different sectors or sites, transmitting the preambles toward different SSBs may have the benefit of facilitating diversity reception by the different sectors or sites.

In an embodiment, the multiple PRACH preambles can be sent in the same RACH occasions (ROs), or on different time division multiplexed (TDMed) ROs or on different frequency division multiplexed (FDMed) ROs.

Figure 10:
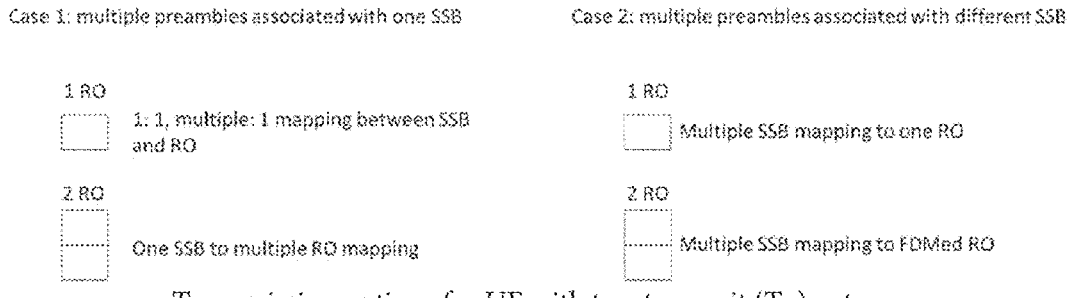
FIG. 10 shows an example of UE with 2 Tx antennas according to an embodiment of the present disclosure.

FIG. 10 shows an example of UE with 2 Tx antennas according to an embodiment of the present disclosure. As shown in FIG. 10, two preambles can be sent simultaneously from 2 Tx chains of the UE. Case 1 is when the two preambles are associated with the same SSB. If one SSB maps to one RO, the two preambles are sent in the same RO. If one SSB maps to multiple FDMed ROs, two preambles can be sent in a same or different ROs of the multiple FDMed ROs. Case 2 is when UE chooses two preambles associated with two preferred SSBs. If the two SSBs map to the same RO, UE sends preambles in this RO. If the two SSBs map to two FDMed ROs, preambles are sent from two ROs.

A benefit of transmitting preambles on different FDMed ROs is that better channel state information is available, since the network can measure the channel response over a P (P is an positive integer) times wider bandwidth when P preambles are transmitted in P different ROs than when the P preambles are transmitted in a single RO. This better CSI (Channel State Information) can be used to better select which Physical Resource Blocks (PRBs) should be scheduled to carry PUSCH (e.g., Msg3). A benefit of transmitting the P preambles, each on a different one of P Tx chains, and in a same RO is that coherent precoders can be better selected, since the best phase to use to combine the Tx chains may vary between FDMed ROs. Therefore, embodiments for coherent closed loop transmit diversity may restrict the P preambles to be transmitted in the same RO simultaneously. Embodiments for open loop or non coherent closed loop diversity may restrict the P preambles to be simultaneously transmitted in different ROs occupying different subcarriers.

It may be observed that being able to identify the best beam by beam sweeping over multiple preambles with a fixed power comes with the cost of slowing down the RACH process since power ramping may otherwise allow the network to detect the beam more quickly. Therefore, in some embodiments the UE beam sweeps with a fixed power only when it measures relatively good channel conditions. Such a measurement may be that an RSRP (Reference Signal Received Power) is above a threshold, or that the UE should transmit from a preamble group associated with a higher RSRP, etc. If such a UE does not measure good channel conditions, it uses existing RACH transmission procedures.

In an embodiment, a UE transmits a set of PRACH (Physical Random Access Channel) preambles at a same power level. The UE further receives a random access response that carries an identifier of a preamble in the set of PRACH preambles and indicates the UE to transmit a physical channel such as PUSCH. The UE transmits the physical channel using the spatial domain transmission filter that it used to transmit the PRACH preamble corresponding to the identifier. In an embodiment, the UE continues to use the spatial domain transmission filter for subsequent transmission of the physical channel. In an embodiment, each preamble in the set of PRACH preambles is transmitted using a different spatial domain transmission filter. In some embodiments, the set of PRACH preambles contains multiple preambles when a channel quality measure is greater than a threshold, and contains a single preamble otherwise.

In an embodiment, additional sets of ROs can be configured for transmission of same preamble by one UE, where each set of RO corresponds to one additional TX chain/antenna. In this way, the network node such as gNB knows whether additional UE antennas is supported based on whether the same preamble is detected on additional ROs. This method doesn't require additional SSB to RO design since the mapping from SSB to RO in the original set of ROs is enough, though this requires more RO resources reserved.

In an embodiment, a separate set of preamble identifiers (IDs) can be configured on top of the maximum number of preamble IDs. For example, another 64 preamble IDs can be defined so that 64 pairs of preamble IDs can be used, each UE can determine whether a pair of preamble ID is to be transmitted or only one of the preamble ID in the pair is used. For example, the 2 preambles in the pair preamble IDs can be correspond to TX chain 1 and TX chain 2 respectively.

In an embodiment, a set of scrambling sequences are introduced for scrambling each preamble. Different scrambling sequence corresponds to different TX chains. In this way, the network node can detect whether two or more TX chains are supported by the UE. For example, 2 scrambling sequences are used for preamble scrambling, and they are used for 1 preamble transmission if both TX chain 1 and TX chain 2 are supported by UE. In this way, no additional preamble sequence generation is needed.

PUSCH Transmit Diversity (TxD)

TxD refers to multiple-antenna ports single-layer transmission, e.g., precoder or beam cycling, antenna hopping. TxD can be open-loop TxD or closed-loop TxD. Open-loop TxD means UE determines TxD-related antenna port or precoder for UL transmission by itself without the network node (such as gNB)'s indication. Closed-loop TxD means the network node (such as gNB) indicates specific antenna port or precoder for UL transmission.

In an embodiment, for closed-loop TxD, a TX diversity flag is signaled to the UE. For example, the signaling can be in RRC signaling, e.g. System Information Block Type 1 (SIB1) or UE dedicated signaling or layer 1 signaling, e.g. in downlink control information (DCI) or in a RAR.

For example, explicit signaling in RRC or RAR or DCI can be used to indicate whether a closed-loop TxD is expected or n open-loop TxD can be used or not.

Both open-loop transmit diversity and closed-loop transmit diversity can be considered to improve Msg3/MsgA PUSCH reliability. In cases where the network node does not have accurate channel state information, it can't select a best precoder, and so will not generally benefit from the use of closed loop TxD. Such cases are candidates for open-loop transmit diversity.

In an embodiment, whether open-loop TxD or close-loop TxD is supported can be determined by one or more of the following.

Whether the PUSCH is a MsgA PUSCH or Msg3 PUSCH. For example, if the PUSCH is a MsgA PUSCH, only open loop TxD is applied considering that MsgA PUSCH is in a first uplink transmission in the Random Access (RA).

Whether a closed-loop TxD configuration is present or not. For example, when no closed-loop TxD is configured, open loop TxD can be used up to UE.

In an embodiment, transmit diversity can be used together with repetition. With the TX diversity flag indicated, the receiver (such as network node) is able to determine whether a coherent combining or soft combining can be used between repetitions.

In an embodiment, transmit diversity is used through e.g. precoder or beam cycling/antenna hopping between MsgA PUSCH repetitions or Msg3 PUSCH repetitions, i.e. different repetitions use different precoder/transmit antenna.

In an embodiment, multiple-antenna precoders include those with data transmitted on a portion of all antenna ports. For example, Table 1 shows an example of 2-AP (antenna port) precoders with data transmitted from one AP.

TABLE 1

$$\frac{1}{\sqrt{2}}\begin{bmatrix}1\\0\end{bmatrix} \qquad \frac{1}{\sqrt{2}}\begin{bmatrix}0\\1\end{bmatrix}$$

Antenna hopping means UE switches antenna ports between transmission with full transmission power.

It may be easier for the UE to maintain phase coherence across consecutive slots, and the channel variation due to UE movement is also minimized over consecutive slots. Therefore, multiple consecutive slots could use the same precoder in order to facilitate more accurate channel estimates through the use of channel estimation filtering over multiple slots.

In an embodiment, the network node may configure multiple numbers of consecutive repetitions where the same precoder/antenna hopping is used or the UE chooses a precoder based on factors including the number of transmit antennas and coherency capability and determines how many repetitions may use the same precoder/antenna hopping.

In an example of Msg3 with 8 repetitions, the network node can configure the UE with 2 Tx antennas to switch precoder/transmit antenna after 4 consecutive repetitions, and the UE with 4 Tx antennas to switch precoder/transmit antenna after 2 consecutive repetitions.

In a general approach, a PUSCH is transmitted over N slots in a subband using a same precoder for M<N consecutive slots, wherein N and M are positive integers. Therefore, in an embodiment, the UE transmits PUSCH using a method for providing spatial diversity for multi-slot transmission.

For example, the UE conveys a set of information bits in a physical channel on N slots, each slot comprising a set of OFDM symbols. The UE receives an indication of a sequence of precoders from the network node, each precoder being an element of a codebook. The UE also transmits the physical channel in a set of contiguous PRBs on M consecutive slots of the N slots using a first precoder of the sequence and using a second precoder of the sequence for at least one slot following the M consecutive slots. In an embodiment, a different redundancy version is used between slots sharing a precoder. In an embodiment, the UE further encodes a first and a second set of error control bits from the set of information bits according to a first redundancy version and a second redundancy version, respectively; and maps the first and second set of error control bits to the physical channel in a first and a second slot of the M consecutive slots, respectively.

In an embodiment, the UE selects an open-loop TxD scheme within its coherency capability.

In an embodiment, the UE determines or is (pre)-configured to transmit the physical channel such as PUSCH using a sequence of precoders from a codebook, where a PUSCH carrying a transport block occupies a same set of PRBs and N repetitions, uses a same precoder and/or antenna over M<N consecutive repetitions, and changes the precoder after M repetitions. The UE may be configured to use a predetermined sequence or is provided each precoder in the sequence independently. In some embodiments, the UE transmits a same set of error control coded bits encoded from the transport block in each of the N PUSCH repetitions. In other embodiments, a first and a second set of error control bits encoded from the transport block for a first and a second redundancy version are transmitted in a first and a second slot of the N repetitions.

In an embodiment, for maximum diversity, precoder cycling and/or antenna hopping could also (or alternatively) be used within a repetition for a PUSCH transmission, wherein the PUSCH on different subset of OFDM symbols uses different precoders/antennas, similar to frequency hopping within a repetition.

In an embodiment, the precoder cycling/antenna hopping is performed so that the same precoder/transmit antenna is not used for two PUSCH repetitions that use the same Hybrid Automatic Repeat request (HARQ) redundancy version.

For example, UE sends Msg3 PUSCH or MsgA PUSCH with 8 repetitions. RV sequence is configured as {0, 2, 1, 3}. Former or latter 4 repetition uses a set of RV. UE has two precoders, {0, 1}. There are two ways to do precoder cycling. Option 1 is to switch precoders between sets of all RV, i.e. after 4th repetition. Option 2 is to switch precoders between repetitions within a set of RV. The precoder pattern, i.e. {0,1} or {1,0} changes between sets of RV. Therefore, with both options, 1st and 5th repetitions with RV 0 use different precoders. The same to nth and (n+4)th repetition. Table 2 shows an example of Msg3 PUSCH or MsgA PUSCH repetitions

TABLE 2

| | 8 Msg3/A repetitions | | | | | | | |
|---|---|---|---|---|---|---|---|---|
| | 1st | 2nd | 3rd | 4th | 5th | 6th | 7th | 8th |
| RV | 0 | 2 | 1 | 3 | 0 | 2 | 1 | 3 |
| Precoder of option 1 | 0 | 0 | 0 | 0 | 1 | 1 | 1 | 1 |

TABLE 2-continued

| | 8 Msg3/A repetitions | | | | | | | |
|---|---|---|---|---|---|---|---|---|
| | 1st | 2nd | 3rd | 4th | 5th | 6th | 7th | 8th |
| Precoder of option 2 | 0 | 1 | 0 | 1 | 1 | 0 | 1 | 0 |

PUSCH Closed-Loop Transmit Diversity and/or Beam Sweeping

In NR, it is possible to use the same beam (also known as a 'spatial domain transmission filter') that is used for PRACH to transmit another channel or signal such as PUCCH (Physical Uplink Control Channel) or SRS. This can improve initial transmission of these other channels, since the information on which beam performs well can be obtained in the PRACH transmission procedure. However, beam identification can have limited effectiveness in the PRACH transmission procedure, since only one PRACH is transmitted at a time by the UE. Another limitation is that there is no feedback to the UE to select beams or PUSCH precoders during the initial access process. Such feedback can be used to improve beam selection or to determine a precoder that will improve PUSCH reception quality at the network node such as gNB.

As mentioned above, the UE transmits a set of RACH preambles, each preamble in different RACH occasions or same PRACH occasion as the other preambles and on a beam different from those of the other preambles. The preambles are transmitted at the same power (that is, without the power ramping between adjacent RACH transmissions that would normally be present), in order to allow the best beam to be identified.

Figure 11:
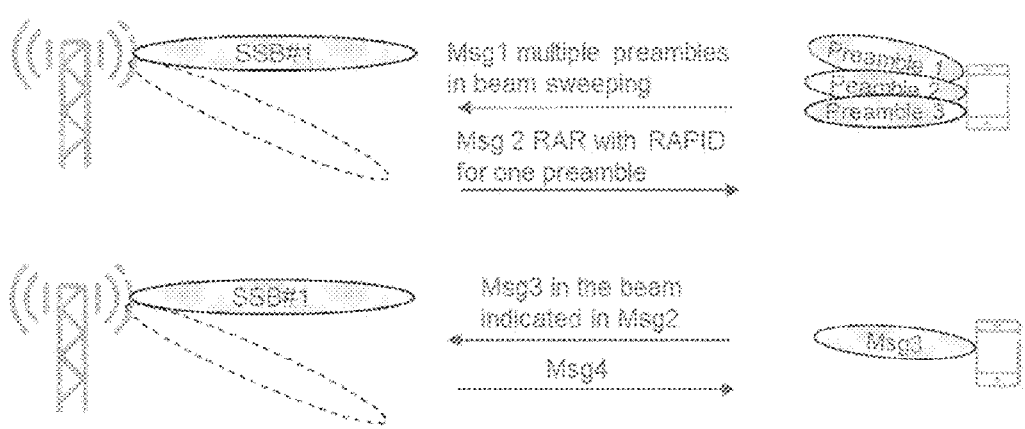
FIG. 11 schematically shows an example of 4-step random access procedure according to an embodiment of the disclosure.

FIG. 11 schematically shows an example of 4-step random access procedure according to an embodiment of the disclosure. As shown in FIG. 11, in case of analogue beam sweeping, i.e. different preambles from one UE are transmitted on different time instances, the UE transmits Msg1 (the entire preamble set, i.e., multiple preambles in beam sweeping) before attempting to receive Msg2. The network node receives the multiple preambles, selects one with the best performance, and responds to the best performance preamble with a Msg2 (RAR) containing the RAPID (random access preamble identifier) for that preamble. The UE transmits a Msg3 using the spatial domain transmission filter it used for the selected preamble identified by the RAPID. The UE may continue to use the spatial domain transmission filter until it is configured otherwise, for example by being configured with a spatialRelationInfo field in an SRS resource configuration. The network node sends Msg4 to the UE. In this way the improved beam found during the RACH procedure can be used for PUSCH transmission, avoiding the need for a separate beam refinement procedure.

Tx Chain Determination Based on Msg1 PRACH Configuration

Multiple Msg1 PRACH preambles are transmitted from the UE to the network node as described above.

In an embodiment, which PRACH preamble can be used by UE with single antenna or multiple antennas can be determined by one or more of following Preamble group in one RO
  E.g., by dedicated or broadcast RRC signaling
Different PRACH Occasions
  E.g., Preambles of RO #1 are for 1-Tx UE. Preambles of RO #2 are for 2-Tx UE.

Different coherency capability
  E.g., Non-coherency UE use preamble for 1-Tx UE, fully coherent UE uses preambles for multiple AP UE For example, contention based random access (CBRA) PRACH preambles of one RO are split into 3 sub-groups for 1Tx UE, 2Tx UE and 4Tx UE. In the sub-group for 2Tx UE, the 1st half of the preambles are for a non-coherent UE and the 2nd half are for a fully coherent UE.

In an embodiment, among the preambles for UEs with a particular number of antenna ports and a particular coherency capability, X consecutive preambles starting from the smallest preamble index are grouped for one UE, wherein X is a positive integer. Following X consecutive preambles are for another UE. X equals the number of preambles one UE transmits.

Therefore, if the network node receives one of the two preambles, the network node knows UE sending this preamble has 2 Tx and its coherency capability and that another specific preamble index is also sent from this UE. In the sub-group for 4Tx UE, preambles are further divided for non-coherent, partially coherent and fully coherent UE. Every four consecutive preambles starting from the smallest preamble index are grouped for one 4Tx UE.

In an embodiment, for the case that multiple preambles from different ROs are sent from one UE's multiple Tx chains, a preamble index from every RO can be reserved by SIB1 for one UE. Thus, the network node such as gNB can know which received preambles are from one UE.

In another embodiment, there are several options of mapping Msg1 PRACH preambles to UE virtual antenna ports (APs).

Option 1-1, AP #0 sends out PRACH preamble with smallest index. AP #1 sends out the one with second smallest index. For UE with 4Tx, AP #3 sends out preamble with the largest index.

Option 1-2, there is no restriction on mapping from PRACH preamble to antenna ports Precoder Determination for Msg3

In an embodiment, after the UE transmits different preambles on different Tx chains, and the network node detects the multiple preambles from the UE, determines a precoder from the preambles, and either sends one or more RARs for the UE containing at least the precoder the UE should use for Msg3 transmission.

In an embodiment, for multi-antenna transmission in a UE in a random access procedure, the UE selects at least one preamble from a set of PRACH preambles configured to the UE, the at least one preamble being associated respectively with respective antenna port. The UE simultaneously transmits the at least one preamble. The UE further receives an indication to transmit a physical channel associated with the at least one preamble and a precoder, and transmits the physical channel on the respective antenna port according to the precoder.

For Msg2, options 2-x are available. Options 2-1 and 2-2 are the network node sending one RAR to the UE. They differ in mapping RAPID and precoder in Msg2 to antenna ports for Msg3 transmission. In option 2-3, the network node sends one RAR for every detected preamble.

Option2-1, the only one RAR toward the UE contains a RAPID corresponding to any one PRACH preamble sent out by the UE. Precoder is mandatory in RAR to indicate single antenna transmission or co-phasing factors of the multiple antennas for Msg3 transmission.

Option2-2, the only one RAR toward the UE contains a RAPID corresponding to a particular PRACH preamble sent out by the UE.

If precoder is absent in RAR, it indicates the network node wants UE to send Msg3 from only one antenna port, which has sent out the RAPID-corresponding preamble.

If precoder is included in RAR, the antenna port, which has sent out the RAPID-corresponding PRACH preamble, is AP #0. For UE with two antenna ports, the other antenna port is AP #1. Note: Precoder in this option is only for UE with 2 antenna ports. Thus, for UE with 4 antenna ports, this option only allows 1 Tx transmission of Msg3, which is indicated by RAPID.

Option 2-3, the network node sends one RAR for every detected preamble. UE selects precoder in one RAR for Msg3 transmission.

For above three options, the number of Msg3 layers can also be indicated in RAR to support multiple-layer Msg3 transmission.

Combination of Msg1 options and Msg2 options can be
1) Msg1 option1-1+Msg2 option2-1
2) Msg1 option1-2+Msg2 option2-2
3) Msg1 option1-1+Msg2 option2-2: If AP indexing in Msg2 is different from the one in Msg1, Msg2's AP indexing overwrites Msg1's AP indexing. The advantage of this combination 3) against 1) is precoder indication is saved in Msg2 if the network node such as gNB wants to configure 1Tx Msg3 transmission.
4) Both Msg1 options (i.e., Msg1 option1-1 and Msg1 option1-2) can work together with Msg2 Option2-3

In an embodiment, if repetition is configured for Msg3, one or more precoders signaled in RAR are used for all repetitions.

Figures 43, 44:
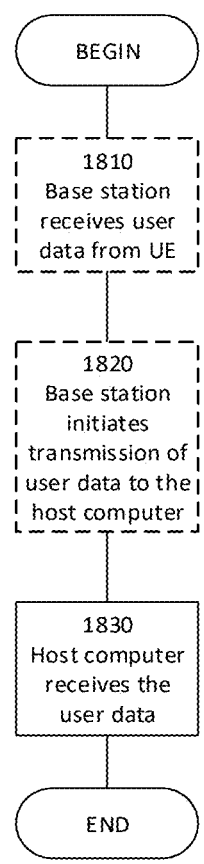
FIG. 43 is a schematic showing methods implemented in a communication system including a host computer, a base station and a user equipment in accordance with some embodiments.

In an embodiment, the precoders for Msg3 can be configured in SIB1 or fixed. For example, the precoders of Msg3 can be a subset of precoders of PUSCH for UE in RRC-_connected mode. For 1-Tx UL transmission, if only TPMI (Transmitted Precoding Matrix Indicator) 4 and TPMI 5 in the precoder table shown in FIG. 44 are configured in SIB1 for Msg3, then 1-bit precoder is needed in RAR.

In an embodiment, UE can use precoder given in Msg2 RAR for subsequent UL transmissions, until UE is RRC reconfigured with a new precoder.

Msg3/MsgA PUSCH Repetition in Frequency Domain

A UE that has N Tx antennas can transmit on N subbands simultaneously without increasing the peak to average power ratio of the signal and while delivering more power because the power from the Tx chains combines. N is an positive integer. The UE can virtualize multiple Tx chains (that is, transmit the same information on multiple antennas such that it is indistinguishable by a receiver from single antenna transmission) to deliver more power, but virtualization is more difficult for PUSCHs occupying a few PRBs, such as Msg3. Allowing transmission in different subbands can avoid the need to virtualize.

In an embodiment, multiple frequency domain repetitions can be triggered by one or separate RAR and have same or different RV, MCS (modulation coding scheme) and precoder.

Figure 12:
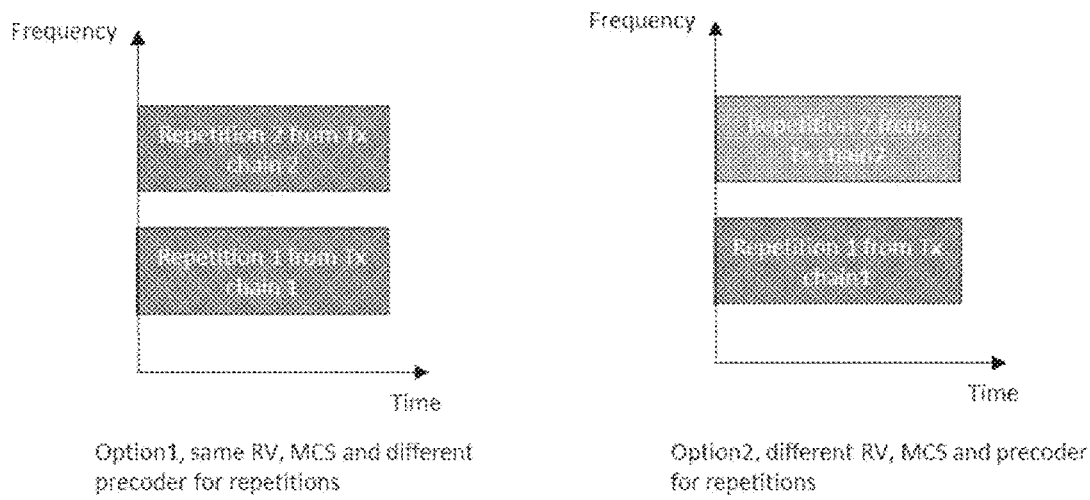
FIG. 12 schematically shows an example of 2 frequency domain repetitions according to an embodiment of the disclosure.

For example, FIG. 12 schematically shows an example of 2 frequency domain repetitions according to an embodiment of the disclosure.

For option 1, one RAR configures MCS and RV, which are the same to all frequency domain segments. Repetitions can use different precoders.

For option 2, one or multiple RAR can schedule multiple segments. Multiple PUSCHs use different MCS, RV and precoders.

In this embodiment, the PUSCH is transmitted in distinct frequency-contiguous segments in each OFDM symbol, and each segment is on the same antenna port (e.g. port 0). Because each segment is carried by a different antenna, using a single antenna port implies that the antennas are virtualized. Such virtualization is generally transparent to the network node such as gNB. The segments should be well separated in the frequency domain in order to maximize frequency diversity, but also to avoid averaging across the segments in gNB channel estimators that are not able to take into account the transparent virtualization of the port. Furthermore, there is no PRG defined for uplink transmissions in NR, and so any frequency domain virtualization used by the UE should be sufficiently similar to that observed fading in a fading channel. Frequency offsets used for Msg3 intra-slot hopping are substantial portions of the system bandwidth, and so are generally suitable for same-symbol frequency hopping embodiments.

In an embodiment, PUSCH is repeated in multiple frequency domain repetitions in each OFDM symbol, with each repetition is carried by a distinct antenna port.

In an embodiment, each repetition contains contiguous PRB. A gap in frequency domain between multiple segments can be configured or predefined.

In an embodiment, each repetition can use intra-slot hopping.

In an embodiment, a UE performs a random access procedure, wherein the UE transmits a physical channel such as PUSCH on a plurality of subbands, each of which occupies contiguous PRBs. The UE maps a set of information bits to the plurality of subbands, the subbands occupying a same OFDM symbol. The UE further indicates the ability to transmit the physical channel on the subbands in the symbol in a non-transparent way, such as: a) transmitting the physical channel using a first DMRS port other than port 0; or b) transmitting a first PRACH preamble that is associated with the physical channel being transmitted on the plurality of subbands in the same OFDM symbol. By implicitly indicates UE's capability to transmit on different subbands, gNB does not need to blindly detect this capability, thus gNB's reception complexity can be reduced.

It may be desirable that each subband is identified by a distinct DMRS port. Therefore, in some such embodiments where the UE transmits a physical channel on a plurality of subbands and transmits the physical channel using a first DMRS port other than port 0, the UE transmits a first DMRS and a second DMRS port, each respectively within a different one of the plurality of subbands.

It may further be desirable that each subband is associated with the same antenna port and subbands are separated by a distance that is fixed, similar to frequency hopping. Therefore, in some such embodiments where the UE transmits a physical channel on a plurality of subbands, the UE may further transmit a same DMRS port within each of the subbands, and transmit the subbands such that they are separated in frequency by a distance that is fixed.

Furthermore, PRACH may be transmitted on different Tx chains, thereby identifying that the UE can transmit N copies of Msg3. Therefore, in some such embodiments where the UE transmits a physical channel on a plurality of subbands and a first PRACH preamble that is associated with the physical channel is transmitted on the plurality of subbands, mapping the information bits comprises mapping the entirety of the information bits to within each subband, and the UE further transmits a second PRACH preamble prior to transmitting the physical channel. The RAR may also instruct the UE to transmit the physical channel on each of the subbands. Therefore, these embodiments may further comprise: the UE receiving a random access response message comprising a first and a second random access response (RAR), each of which contains an identifier for either the first or second PRACH preamble. The UE also transmits the physical channel in a first and a second subband of the subbands according to the first and second RAR, respectively.

Msg3/MsgA PUSCH Repetition in Spatial Domain

It may use multiple PUSCH layers for Msg3/A PUSCH transmission.

In an embodiment, PUSCH is repeated in spatial domain, with each repetition is carried by a distinct layer, which can be one or multiple antenna ports.

In an embodiment, the number of spatial repetitions equals the number of layers.

The number of layers for Msg3 can be indicated in RAR by methods as described above.

In an embodiment, spatial domain repetition can be used together with one or more of following
- intra-slot hopping
- frequency domain repetition
- time domain repetition In an embodiment, Msg3/MsgA PUSCH repetition in spatial domain is indicated to UE by MAC (medium access control) RAR/RRC/L1 signalling.

Beam Refinement for UE Capable of Beam Correspondence

In NR, a principle is that Msg1/3/A UL beam is the same as the preferred SSB beam. In an embodiment, default CSI-RS resource settings are configured in SIB1 for the purpose of early CSI report in Msg3 and the network node such as gNB sends out cell-specific CSI-RS (Channel State Information Reference Signal). In an embodiment, a UE which supports TX/RX beam correspondence can refine UL beam based on the received default CSI-RS before/during RACH process.

In an embodiment, UE can refine Msg1 and/or Msg3 and/or MsgA UL beam based on the received SSB beam and/or the early CSI-RS beams if available before/during RACH process. Refined Msg1 and/or Msg3 and/or MsgA UL beam can be narrower than the default UL Tx beam associated with the preferred SSB beam, but still within default beam width so this wouldn't impact the network node (gNB) reception.

In an embodiment, the best SSB beam can be used as a reference for the uplink transmission during the random access, e.g. for Msg3 or MsgA, or Msg1 transmission.

Figure 13:
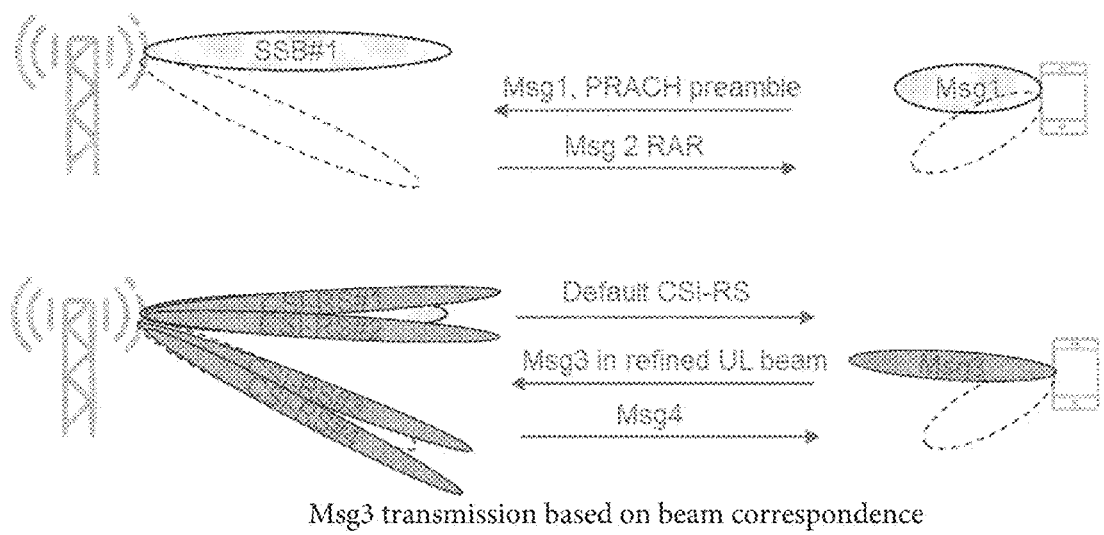
FIG. 13 schematically shows an example of 4-step random access procedure according to another embodiment of the disclosure.

In an embodiment, the best early CSI-RS beam can be used as a reference for the uplink transmission during the random access, e.g. for Msg3 or MsgA, or Msg1 transmission FIG. 13 schematically shows an example of 4-step random access procedure according to another embodiment of the disclosure. As shown in FIG. 13, Msg1 beam has the same spatial relation with SSB #1 beam, and two CSI-RS overlap with one SSB beam. Msg3 beam has the same spatial relation with CSI-RS #2.

Early SRS in RACH

In NR, UL beamforming is configured after RRC connection is setup. UE sends Msg1/3 in the beams of preferred SSB. In an embodiment, the solutions of codebook-based Msg3 and non-codebook-based Msg3 are introduced.

As discussed above with respect to Msg3 closed loop transmit diversity and/or beamforming, beam refinement assisted by the network node (gNB) is not supported during initial access. UL beam refinement is supported by configuring multiple SRS resources in an SRS resource set, and transmitting the resources in the set using different beams ('spatial domain transmission filters'), but this can be done only after the UE is in RRC_CONNECTED state.

One approach is to transmit SRS resources using the same spatial characteristics as PRACH preambles. For example, a PRACH preamble may be transmitted on an antenna, possibly with a beampattern ('spatial domain transmission filter') that may be selected or adapted. Each SRS in an SRS resource set may then be associated with a PRACH preamble to identify that the SRS resource and the PRACH preamble are transmitted with the same spatial domain transmission filter. A fixed mapping between the PRACH preambles and the SRS resources may be used.

Furthermore, each PRACH preambles may further be associated with an SRS port in an SRS resource, thereby allowing a precoder to be used to transmit a PUSCH. For example, a first preamble and a second preamble could map to a first port and a second port of a first SRS resource, while a third and a fourth preamble could map to a first port and a second port of a second SRS resource.

In an embodiment, SRS resources to PRACH resource mapping can be defined to determine in a UE-specific way. Here SRS resources can be time/frequency/spatial domain resources, sequence, cyclic shift, ports. PRACH resource can be PRACH sequence ID, time/frequency/spatial domain resources.

In an embodiment, SRS resources used during RACH procedure can be configured by SIB1 for UE during RACH procedure.

In an embodiment, separate time/frequency resources are reserved for SRS with different number of ports, e.g., 1, 2 or 4 ports.

Figure 14:
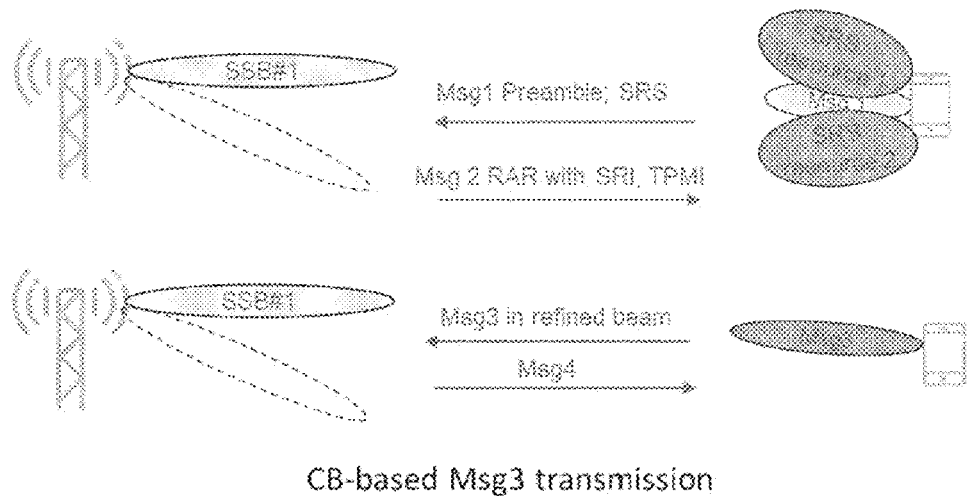
FIG. 14 schematically shows an example of 4-step random access procedure according to another embodiment of the disclosure.

FIG. 14 schematically shows an example of 4-step random access procedure according to another embodiment of the disclosure. As shown in FIG. 14, to trigger codebook-based msg3 transmission, two steps are taken.

Step 1: the UE sends non-precoded SRS resources before msg2 according to SRS configuration in SIB1. SRS is sent with the same timing as msg1 preamble. The number of SRS ports of each resource equals the minimum between UE Tx antenna and the number of SRS ports configured in SIB1. Beams of SRS resources can be independent from Msg1 beam. SRS is sent at least a certain period of time before Msg2 receiving window. The time span is configured or predefined.

Step 2: network receives multiple SRS resources and indicates one SRS resource and precoder in msg2 RAR. Precoder has the same number of row as number of ports in the SRS resource and only one column, indicating RI=1.

Then UE sends Msg3 and other PUSCH transmission in the direction of SRI with precoder until it is configured another SRI.

Figure 15:
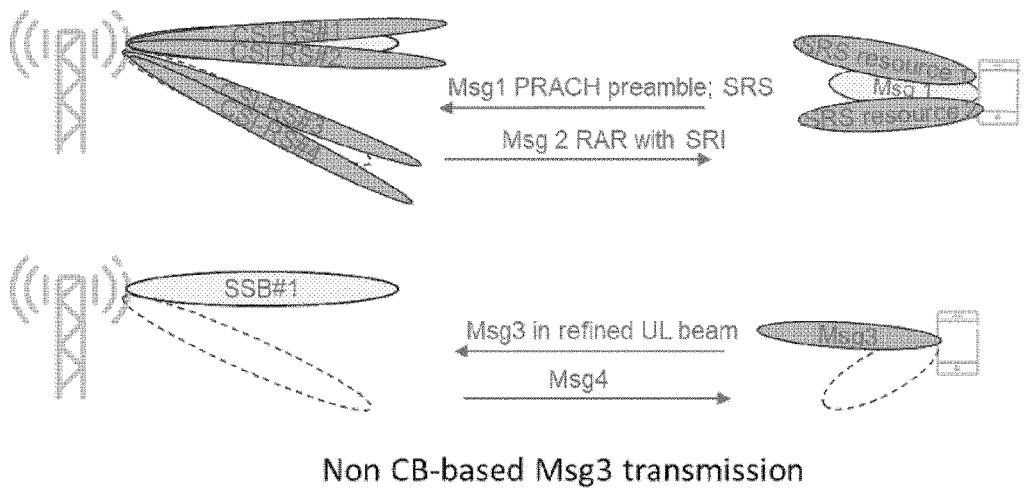
FIG. 15 schematically shows an example of 4-step random access procedure according to another embodiment of the disclosure.

FIG. 15 schematically shows an example of 4-step random access procedure according to another embodiment of the disclosure. As shown in FIG. 15, to trigger non-codebook based msg3 transmission, two steps are taken.

Step 1: UE receives cell-specific CSI-RS and sends beamformed SRS beams based on reciprocity in SIB1 configured time/frequency resources. There is only one port of each beam. SRS is sent at least a certain period of time before Msg2 receiving window. The time span is configured or predefined. SRS is sent with the same timing as msg1 preamble.

Step 2: the network node detects the strongest SRS and sends corresponding SRS resource ID in Msg2 or a separate DCI to the UE.

Then UE sends Msg3 and other UL transmission in the direction of indicated SRS resource with precoder until it is configured another SRS resource.

In an embodiment, PUSCH is transmitted over N slots in a subband using a same precoder for M<N consecutive slots. A method for providing spatial diversity for multi-slot transmission in a UE, wherein the UE conveys a set of information bits in a physical channel on N slots, each slot comprising a set of OFDM symbols. The method comprises:
  Receiving an indication of a sequence of precoders, each precoder being an element of a codebook;
  Transmitting the physical channel in a set of contiguous PRBs on M consecutive slots of the N slots using a first precoder of the sequence; and
  Transmitting the physical channel using a second precoder of the sequence for at least one slot following the M consecutive slots.

In an embodiment, a different redundancy version is used between slots sharing a precoder. The method further comprises:
  Encoding a first and a second set of error control bits from the set of information bits according to a first and a second redundancy version, respectively; and
  Mapping the first and second set of error control bits to the physical channel in the first and a second slot of the M consecutive slots, respectively.

In an embodiment, UE transmits different preambles on different Tx chains, the network node such as gNB determines a precoder from the preambles, and UE uses the preamble for Msg3). A method of multi-antenna transmission for a random access procedure in a UE, comprising
  Selecting a first and a second preamble from a set of PRACH preambles configured to the UE, the first and second preambles being associated respectively with a first and a second antenna port;
  Simultaneously transmitting the first and second preamble;
  Receiving an indication to transmit a physical channel associated with the first and second preamble comprising a precoder;
  Transmitting the physical channel on the first and second antenna ports according to the precoder In an embodiment, Msg3 PUSCH is transmitted in subbands of an OFDM symbol to obtain diversity and combine power of Tx chains. The ability to do so is signaled implicitly by the UE. A method for a random access procedure in a UE, wherein the UE transmits a physical channel on a plurality of subbands, each of which occupies contiguous PRBs, comprising
  Mapping a single codeword to the plurality of subbands, the subbands occupying a same OFDM symbol.
  Indicating the ability to transmit the physical channel on the subbands in the symbol by one of:
    Transmitting the physical channel using a first DMRS port other than port 0;
    Transmitting a first PRACH preamble that is associated with the physical channel being transmitted on the plurality of subbands in the same OFDM symbol.

In an embodiment, each subband is identified by a distinct DMRS port. The method further comprises transmitting the first DMRS and a second DMRS port, each respectively within a different one of the plurality of subbands.

In an embodiment, each subband is associated with the same antenna port and subbands are separated by a distance that is fixed in specification, similar to frequency hopping. The method further comprises
  Transmitting a same DMRS port within each of the subbands,
  Transmitting the subbands such that they are separated in frequency by a distance that is fixed in specification.

In an embodiment, PRACH is transmitted on different Tx chains, identifying that UE can transmit N copies of Msg3, wherein mapping the single codeword comprises mapping the entirety of the codeword to within each subband. The method further comprises transmitting a second PRACH preamble prior to transmitting the physical channel.

In an embodiment, RAR instructs UE to transmit on each of the subbands. The method further comprises
  Receiving a random access response message comprising a first and a second random access response (RAR), each of which contains an identifier for either the first or second PRACH preamble.
  Transmitting in a first and a second subband of the subbands according to the first and second RAR, respectively.

Figure 16:
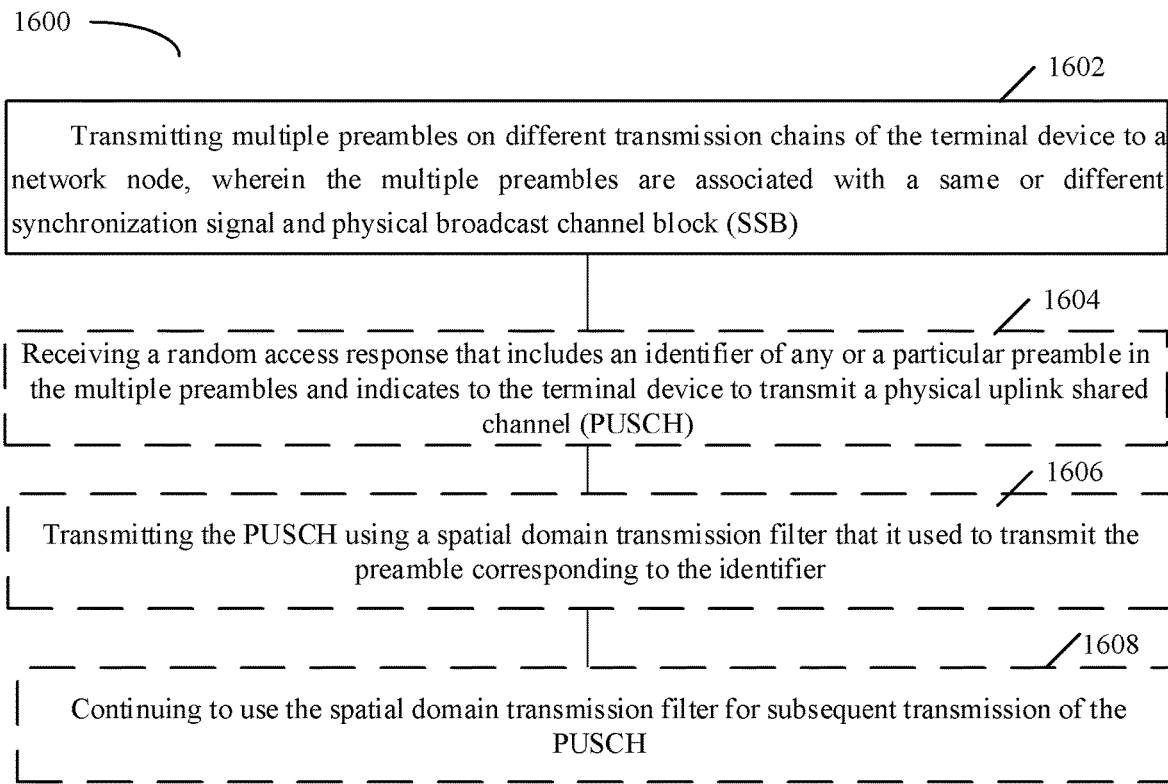
FIG. 16 shows a flowchart of a method according to an embodiment of the present disclosure.

FIG. 16 shows a flowchart of a method 1600 according to an embodiment of the present disclosure, which may be performed by an apparatus implemented in or at or communicatively coupled to a terminal device or any other entity having similar functionality. As such, the terminal device may provide means or modules for accomplishing various parts of the method 1600 as well as means or modules for accomplishing other processes in conjunction with other components.

At block 1602, the terminal device may transmit multiple preambles on different transmission chains of the terminal device to a network node. The multiple preambles are associated with a same or different synchronization signal and physical broadcast channel block (SSB). As described above, before initiating random access procedure, the terminal device may need to go through an initial synchronization process. For example, the terminal device may detect a synchronization signal (SS) such as Primary Synchronization Signals (PSSs) and Secondary Synchronization Signals (SSSs). Then the UE may decode the broadcasted system information such as PBCH (Physical Broadcast Channel), RMSI (Remaining Minimum System Information), OSI (Other System Information), etc.

In an embodiment, the multiple preambles are the preambles mapping to a best SSB in different directions.

In an embodiment, the multiple preambles are simultaneously transmitted in a same random access channel occasion (RO) or are transmitted in different time division multiplexed ROs or are simultaneously transmitted in different frequency division multiplexed ROs.

In an embodiment, when the multiple preambles are associated with the same SSB,
  when one SSB maps to one RO, the multiple preambles are transmitted in the same RO, and
  when one SSB maps to multiple frequency division multiplexed ROs, the multiple preambles are transmitted in a same RO or different ROs.

In an embodiment, when the multiple preambles are associated with different SSBs,
  when the different SSBs map to a same RO, the multiple preambles are transmitted in the same RO, and
  when the different SSBs map to multiple frequency division multiplexed ROs, the multiple preambles are transmitted in the multiple frequency division multiplexed ROs.

In an embodiment, when a coherent closed loop transmit diversity is used, the multiple preambles are simultaneously transmitted in the same RO.

In an embodiment, when an open loop transmit diversity or a non coherent closed loop transmit diversity is used, the multiple preambles are simultaneously transmitted in different frequency division multiplexed ROs.

In an embodiment, the multiple preambles are transmitted at a same power level.

In an embodiment, each of the multiple preambles is transmitted using a different spatial domain transmission filter.

In an embodiment, the multiple preambles contain the preambles when a channel quality measure (such as signal quality or signal level. e.g. RSRP, measured on SSB or CSI-RS) is greater than a threshold.

In an embodiment, a set of random access channel occasions (ROs) is configured for transmission of a same preamble and each set of ROs corresponds to a different transmission chain of the terminal device.

In an embodiment, a preamble is configured with at least two preamble identifiers (IDs) and each preamble identifier ID corresponds to a different transmission chain of the terminal device.

In an embodiment, a set of scrambling sequences are able to be used for scrambling each preamble and each scrambling sequence corresponds to a different transmission chain of the terminal device.

In an embodiment, the multiple preambles are determined based on at least one of:

a preamble group in one RO;

different ROs; or different coherency capability.

In an embodiment, a number of consecutive preambles are grouped for a terminal device requiring the number of consecutive preambles to transmit.

In an embodiment, the preambles are divided for a non-coherent terminal device, a partially coherent terminal device and a fully coherent terminal device.

In an embodiment, a preamble index from every RO is reserved by System Information Block Type 1 (SIB1) for a terminal device.

In an embodiment, there is a mapping between the preambles and virtual antenna ports of the terminal device.

At block 1604, optionally, the terminal device receives a random access response that includes an identifier of any or a particular preamble in the multiple preambles and indicates to the terminal device to transmit a physical uplink shared channel (PUSCH);

At block 1606, optionally, the terminal device transmits the PUSCH using a spatial domain transmission filter that it used to transmit the preamble corresponding to the identifier.

At block 1608, optionally, the terminal device continues to use the spatial domain transmission filter for subsequent transmission of the PUSCH.

FIG. 17 shows a flowchart of a method 1700 according to an embodiment of the present disclosure, which may be performed by an apparatus implemented in or at or communicatively coupled to a terminal device or any other entity having similar functionality. As such, the terminal device may provide means or modules for accomplishing various parts of the method 1700 as well as means or modules for accomplishing other processes in conjunction with other components. For some parts which have been described in the above embodiments, detailed description thereof is omitted here for brevity. Block 1702 is same as block 1602 of FIG. 16.

At block 1704, the terminal device receives a random access response for each of the multiple preambles, wherein random access response includes an identifier of a corresponding preamble and indicates to the terminal device to transmit a physical uplink shared channel (PUSCH).

At block 1706, the terminal device transmits the PUSCH using a spatial domain transmission filter that it used to transmit the preamble corresponding to the identifier.

In an embodiment, the random access response further includes a precoder that the terminal device uses for PUSCH transmission.

In an embodiment, when the precoder is absent in the random access response, the PUSCH is transmitted from only one antenna port which has transmitted the preamble corresponding to the identifier.

In an embodiment, a number of PUSCH layers is indicated in the random access response to support multiple-layer PUSCH transmission.

In an embodiment, when repetition is configured for PUSCH, one or more precoders included in the random access response are used for all PUSCH repetitions.

In an embodiment, the precoder for PUSCH is configured in System Information Block Type 1 (SIB1) or predefined.

In an embodiment, the precoder included in the random access response are used for subsequent PUSCH transmissions.

In an embodiment, the preamble and the PUSCH are transmitted together as a message A in a two-step random access procedure or the preamble and the PUSCH are transmitted as a message 1 and message 3 respectively in a four-step random access procedure.

FIG. 18*a* shows a flowchart of a method 1800 according to an embodiment of the present disclosure, which may be performed by an apparatus implemented in or at or communicatively coupled to a terminal device or any other entity having similar functionality. As such, the terminal device may provide means or modules for accomplishing various parts of the method 1800 as well as means or modules for accomplishing other processes in conjunction with other components. For some parts which have been described in the above embodiments, detailed description thereof is omitted here for brevity.

At block 1802, the terminal device determines physical uplink shared channel (PUSCH) repetition in frequency domain.

At block 1804, the terminal device repeats the PUSCH in frequency domain.

In an embodiment, multiple frequency domain PUSCH repetitions are triggered by one or more random access responses and have same or different redundancy versions, modulation coding schemes and precoders.

In an embodiment, the PUSCH is repeated in multiple frequency domain repetitions in each Orthogonal Frequency-Division Multiple (OFDM) symbol and each PUSCH repetition is transmitted by a distinct antenna port.

In an embodiment, each PUSCH repetition contains contiguous physical resource blocks and a gap in frequency domain between multiple PUSCH repetitions is configured or predefined.

In an embodiment, each PUSCH repetition uses intra-slot hopping.

FIG. 18*b* shows a flowchart of a method 1810 according to an embodiment of the present disclosure, which may be performed by an apparatus implemented in or at or communicatively coupled to a terminal device or any other entity having similar functionality. As such, the terminal device may provide means or modules for accomplishing various parts of the method 1810 as well as means or modules for accomplishing other processes in conjunction with other components. For some parts which have been described in the above embodiments, detailed description thereof is omitted here for brevity.

In this embodiment, a set of information bits of the PUSCH are mapped to a plurality of subbands and the plurality of subbands occupies a same Orthogonal Frequency-Division Multiple (OFDM) symbol.

At block 1812, the terminal device indicates to the network node ability information for transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol.

In an embodiment, each of the plurality of subbands is identified by a distinct DMRS port.

In an embodiment, each of the plurality of subbands is associated with a same antenna port and the plurality of subbands are separated by a fixed distance.

In an embodiment, an entirety of information bits of the PUSCH are mapped to each of the plurality of subbands, the random access response includes an identifier for a corresponding preamble, the PUSCH is transmitted in a subband of the plurality of subbands according to the random access response.

In an embodiment, the PUSCH is a message A PUSCH in a two-step random access procedure or the PUSCH is message 3 in a four-step random access procedure.

FIG. 19 shows a flowchart of a method 1900 according to an embodiment of the present disclosure, which may be performed by an apparatus implemented in or at or communicatively coupled to a terminal device or any other entity having similar functionality. As such, the terminal device may provide means or modules for accomplishing various parts of the method 1900 as well as means or modules for accomplishing other processes in conjunction with other components. For some parts which have been described in the above embodiments, detailed description thereof is omitted here for brevity.

At block 1902, the terminal device determines physical uplink shared channel (PUSCH) repetition in spatial domain.

At block 1904, the terminal device repeats the PUSCH in spatial domain.

In an embodiment, each PUSCH repetition is transmitted by a distinct layer.

In an embodiment, a number of PUSCH spatial domain repetitions equals to the number of layers.

In an embodiment, the PUSCH spatial domain repetition is used together with one or more of following:
 intra-slot hopping;
 frequency domain repetition; or
 time domain repetition.

In an embodiment, the PUSCH repetition in spatial domain is indicated to the terminal device by one of medium access control control element (MAC CE), radio resource control (RRC) message, a random access response (RAR) or downlink control information (DCI) or layer 1 signalling.

In an embodiment, the PUSCH is a message A PUSCH in a two-step random access procedure or the PUSCH is message 3 in a four-step random access procedure.

Figure 20:
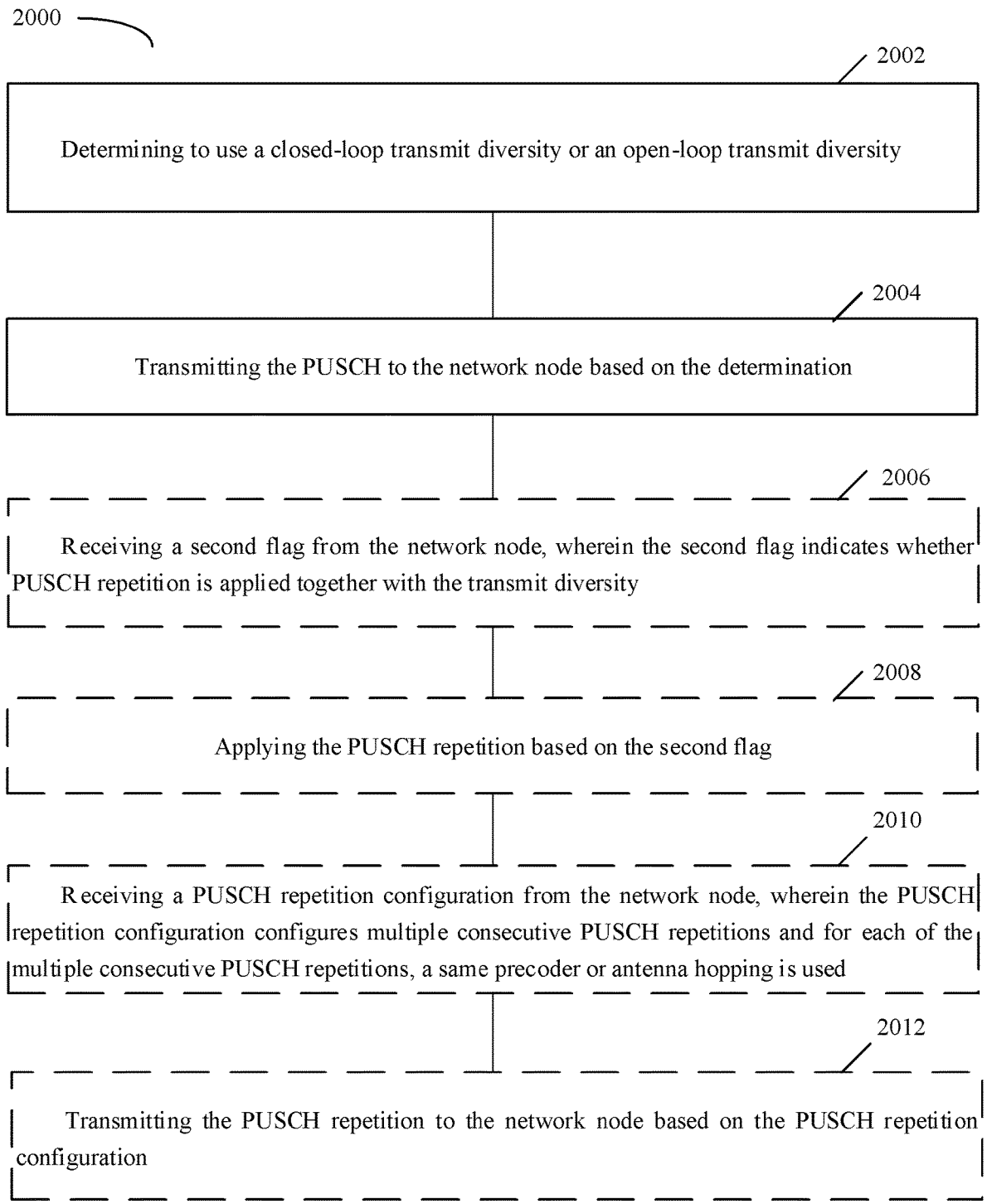
FIG. 20 shows a flowchart of a method according to an embodiment of the present disclosure.

FIG. 20 shows a flowchart of a method 2000 according to an embodiment of the present disclosure, which may be performed by an apparatus implemented in or at or communicatively coupled to a terminal device or any other entity having similar functionality. As such, the terminal device may provide means or modules for accomplishing various parts of the method 2000 as well as means or modules for accomplishing other processes in conjunction with other components. For some parts which have been described in the above embodiments, detailed description thereof is omitted here for brevity.

At block 2002, the terminal device determines to use a closed-loop transmit diversity or an open-loop transmit diversity.

At block 2004, the terminal device transmits the PUSCH to the network node based on the determination.

In an embodiment, determining to use a closed-loop transmit diversity or an open-loop transmit diversity comprises: receiving a first flag from the network node, wherein the flag indicates whether the closed-loop transmit diversity or the open-loop transmit diversity is used; and determining to use the closed-loop transmit diversity or the open-loop transmit diversity based on the first flag.

In an embodiment, the first flag is included in at least one of radio resource control (RRC) message or a random access response (RAR) or downlink control information (DCI).

In an embodiment, determining to use a closed-loop transmit diversity or an open-loop transmit diversity comprises: when the PUSCH is a massage A PUSCH of a two-step random access procedure, determining to use the open-loop transmit diversity; and when no closed-loop transmit diversity is configured, determining whether to use the open-loop transmit diversity.

At block 2006, optionally, the terminal device receives a second flag from the network node, wherein the second flag indicates whether PUSCH repetition is applied together with the transmit diversity.

At block 2008, optionally, the terminal device applies the PUSCH repetition based on the second flag.

In an embodiment, when the PUSCH repetition is applied, different PUSCH repetitions use different precoders or antenna hopping.

At block 2010, optionally, the terminal device receives a PUSCH repetition configuration from the network node, wherein the PUSCH repetition configuration configures multiple consecutive PUSCH repetitions and for each of the multiple consecutive PUSCH repetitions, a same precoder or antenna hopping is used At block 2012, optionally, the terminal device transmits the PUSCH repetition to the network node based on the PUSCH repetition configuration.

Figure 21:
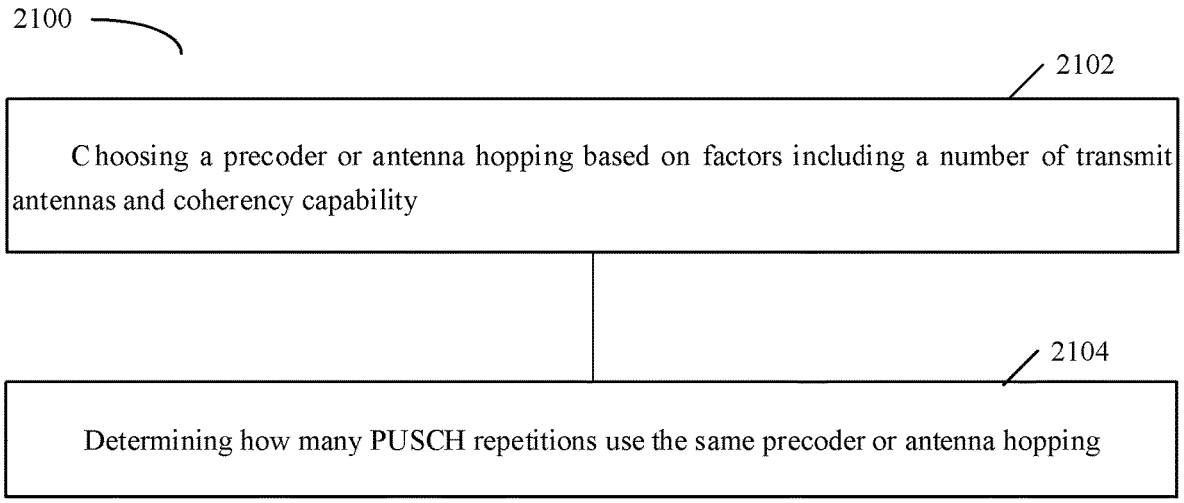
FIG. 21 shows a flowchart of a method according to an embodiment of the present disclosure.

FIG. 21 shows a flowchart of a method 2100 according to an embodiment of the present disclosure, which may be performed by an apparatus implemented in or at or communicatively coupled to a terminal device or any other entity having similar functionality. As such, the terminal device may provide means or modules for accomplishing various parts of the method 2100 as well as means or modules for accomplishing other processes in conjunction with other components. For some parts which have been described in the above embodiments, detailed description thereof is omitted here for brevity.

At block 2102, the terminal device chooses a precoder or antenna hopping based on factors including a number of transmit antennas and coherency capability.

At block 2104, the terminal device determines how many PUSCH repetitions use the same precoder or antenna hopping.

In an embodiment, the PUSCH is transmitted over N PUSCH repetitions, M consecutive PUSCH repetitions of N PUSCH repetitions are transmitted using a first precoder of the sequence of precoders and at least one PUSCH repetition following the M consecutive PUSCH repetitions of the N PUSCH repetitions is transmitted using a second precoder of the sequence of precoders, wherein M and N are positive integers and M is smaller than N.

In an embodiment, a different redundancy version is used between PUSCH repetitions sharing a precoder.

In an embodiment, determining to use a closed-loop transmit diversity or an open-loop transmit diversity comprising: determining to use the open-loop transmit diversity within coherency capability of the terminal device.

In an embodiment, precoder cycling and/or antenna hopping is used within a

PUSCH repetition and the PUSCH on different subset of Orthogonal Frequency-Division Multiple (OFDM) symbols uses different precoders and/or antennas.

In an embodiment, precoder cycling and/or antenna hopping is performed so that a same precoder and/or transmit antenna is not used for two PUSCH repetitions that use a same Hybrid Automatic Repeat request (HARQ) redundancy version.

In an embodiment, the PUSCH is a message A PUSCH in a two-step random access procedure or the PUSCH is message 3 in a four-step random access procedure.

Figure 22:
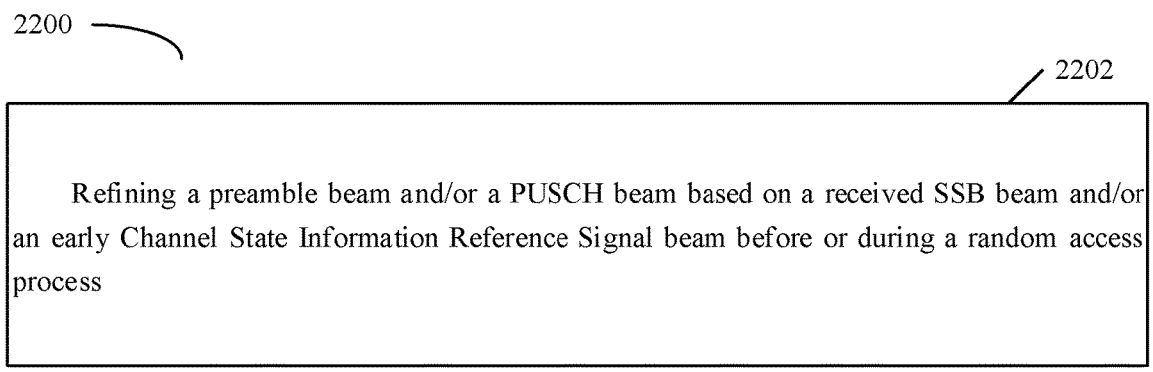
FIG. 22 shows a flowchart of a method according to an embodiment of the present disclosure.

FIG. 22 shows a flowchart of a method 2200 according to an embodiment of the present disclosure, which may be performed by an apparatus implemented in or at or communicatively coupled to a terminal device or any other entity having similar functionality.

As such, the terminal device may provide means or modules for accomplishing various parts of the method 2200 as well as means or modules for accomplishing other processes in conjunction with other components. For some parts which have been described in the above embodiments, detailed description thereof is omitted here for brevity.

At block 2202, the terminal device refines a preamble beam and/or a PUSCH beam based on a received SSB beam and/or an early Channel State Information Reference Signal beam before or during a random access process.

In an embodiment, a best SSB beam is used as a reference for the preamble transmission and/or the PUSCH transmission during the random access.

In an embodiment, a best early CSI-RS beam is used as a reference for the preamble transmission and/or the PUSCH transmission during the random access.

In an embodiment, there is a mapping between Sounding Reference Signal (SRS) resources to physical random access channel (PRACH) resource.

In an embodiment, the SRS resources includes at least one of time domain resources, frequency domain resources, spatial domain resources, sequence, cyclic shift, or ports and the PRACH resource includes at least one of PRACH sequence identifier, time domain resources, frequency domain resources, or spatial domain resources.

In an embodiment, the SRS resources used during random access procedure is configured by System Information Block Type 1 (SIB1).

In an embodiment, separate time resources and/or frequency resources are reserved for SRS with different number of ports.

Figure 23:
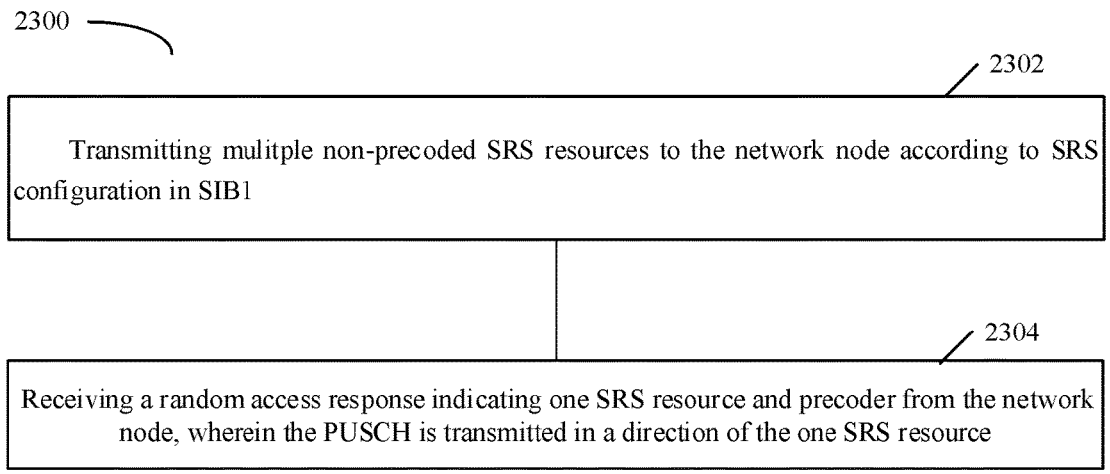
FIG. 23 shows a flowchart of a method according to an embodiment of the present disclosure.

FIG. 23 shows a flowchart of a method 2300 according to an embodiment of the present disclosure.

At block 2302, the terminal device transmits multiple non-precoded SRS resources to the network node according to SRS configuration in SIB1.

At block 2304, the terminal device receives a random access response indicating one SRS resource and precoder from the network node. The PUSCH is transmitted in a direction of the one SRS resource.

Figure 24:
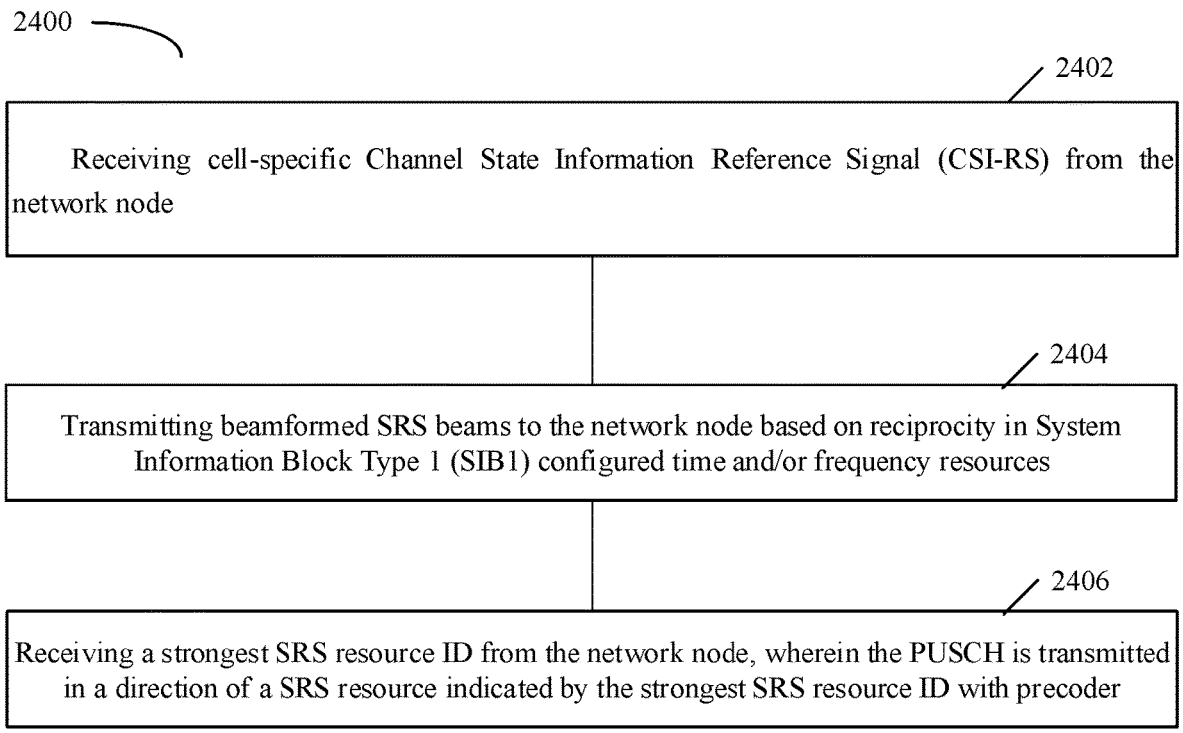
FIG. 24 shows a flowchart of a method according to an embodiment of the present disclosure.

FIG. 24 shows a flowchart of a method 2400 according to an embodiment of the present disclosure.

At block 2402, the terminal device receives cell-specific Channel State Information Reference Signal (CSI-RS) from the network node.

At block 2402, the terminal device transmits beamformed SRS beams to the network node based on reciprocity in System Information Block Type 1 (SIB1) configured time and/or frequency resources;

At block 2406, the terminal device receives a strongest SRS resource ID from the network node. The PUSCH is transmitted in a direction of a SRS resource indicated by the strongest SRS resource ID with precoder.

In an embodiment, the preamble and the PUSCH are transmitted together as a message A in a two-step random access procedure or the preamble and the PUSCH are transmitted as a message 1 and message 3 respectively in a four-step random access procedure.

Figure 25:
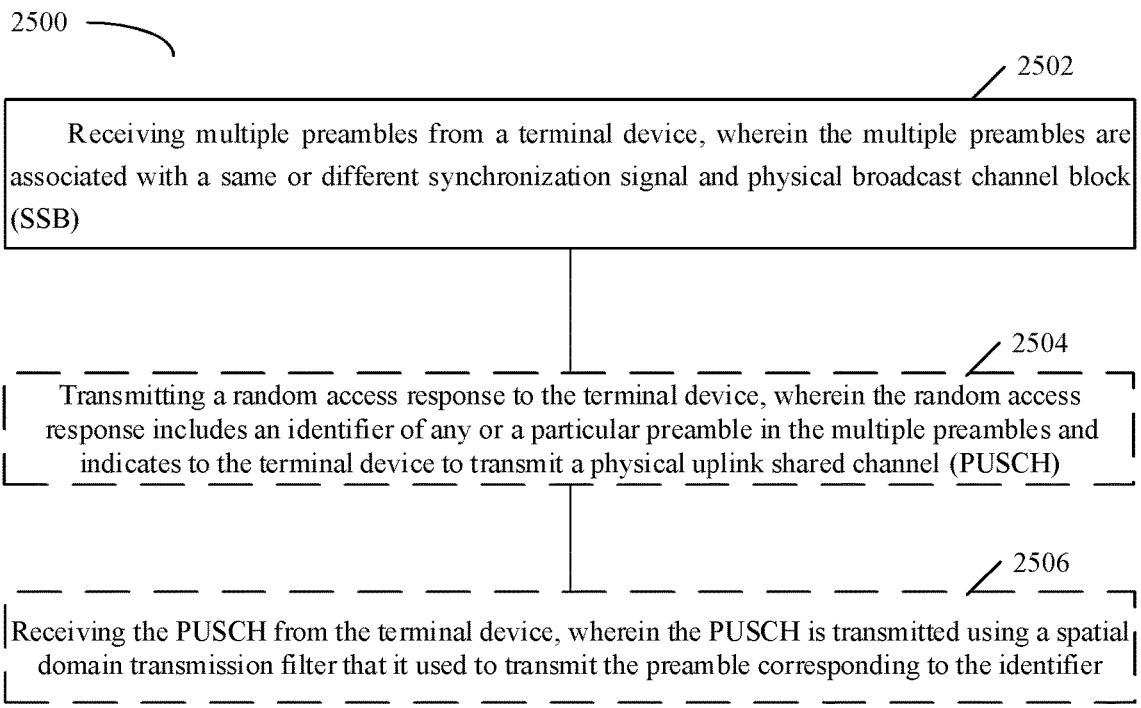
FIG. 25 shows a flowchart of a method according to an embodiment of the present disclosure.

FIG. 25 shows a flowchart of a method 2500 according to an embodiment of the present disclosure, which may be performed by an apparatus implemented in or at or communicatively coupled to a network node or any other entity having similar functionality. As such, the network node may provide means or modules for accomplishing various parts of the method 2500 as well as means or modules for accomplishing other processes in conjunction with other components. For some parts which have been described in the above embodiments, detailed description thereof is omitted here for brevity.

At block 2502, the network node receives multiple preambles from a terminal device, wherein the multiple preambles are associated with a same or different synchronization signal and physical broadcast channel block (SSB).

At block 2504, optionally, the network node transmits a random access response to the terminal device, wherein the random access response includes an identifier of any or a particular preamble in the multiple preambles and indicates to the terminal device to transmit a physical uplink shared channel (PUSCH).

At block 2506, optionally, the network node receives the PUSCH from the terminal device, wherein the PUSCH is transmitted using a spatial domain transmission filter that it used to transmit the preamble corresponding to the identifier.

Figure 26:
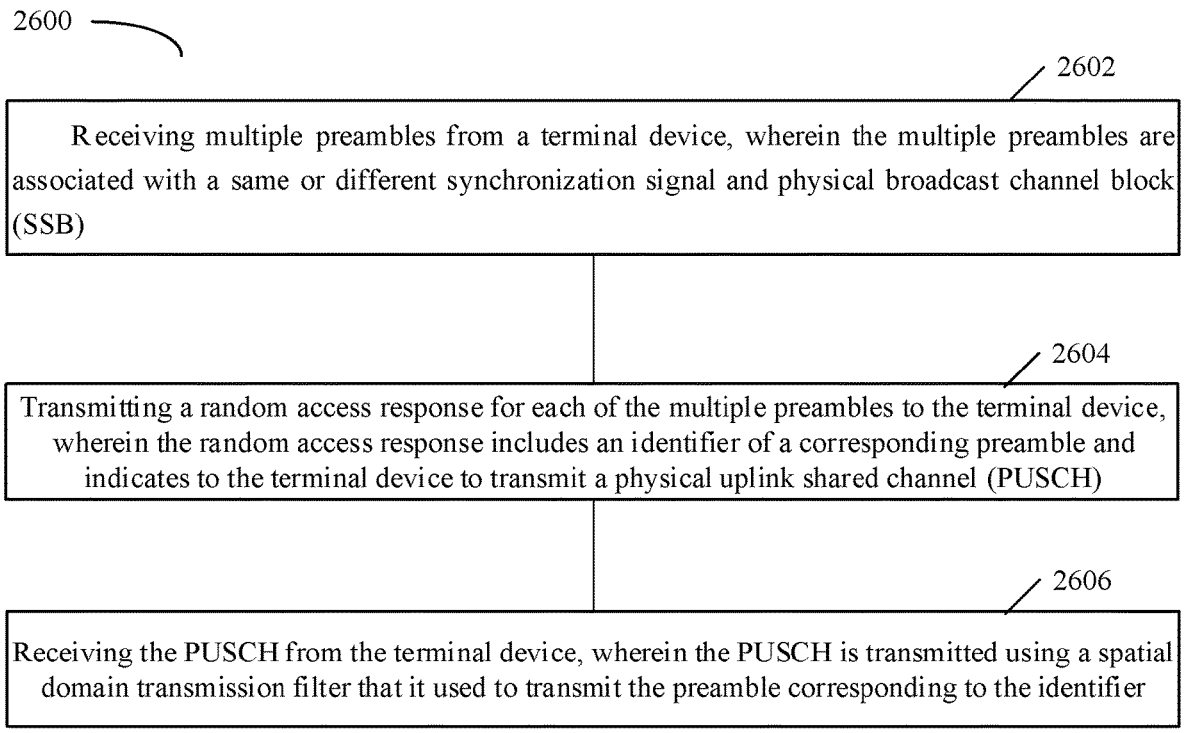
FIG. 26 shows a flowchart of a method according to an embodiment of the present disclosure.

FIG. 26 shows a flowchart of a method 2600 according to an embodiment of the present disclosure.

At block 2602, the network node receives multiple preambles from a terminal device, wherein the multiple preambles are associated with a same or different synchronization signal and physical broadcast channel block (SSB).

At block 2604, the network node transmits a random access response for each of the multiple preambles to the terminal device, wherein the random access response includes an identifier of a corresponding preamble and indicates to the terminal device to transmit a physical uplink shared channel (PUSCH).

At block 2606, the network node receives the PUSCH from the terminal device, wherein the PUSCH is transmitted using a spatial domain transmission filter that it used to transmit the preamble corresponding to the identifier.

Figure 27A:
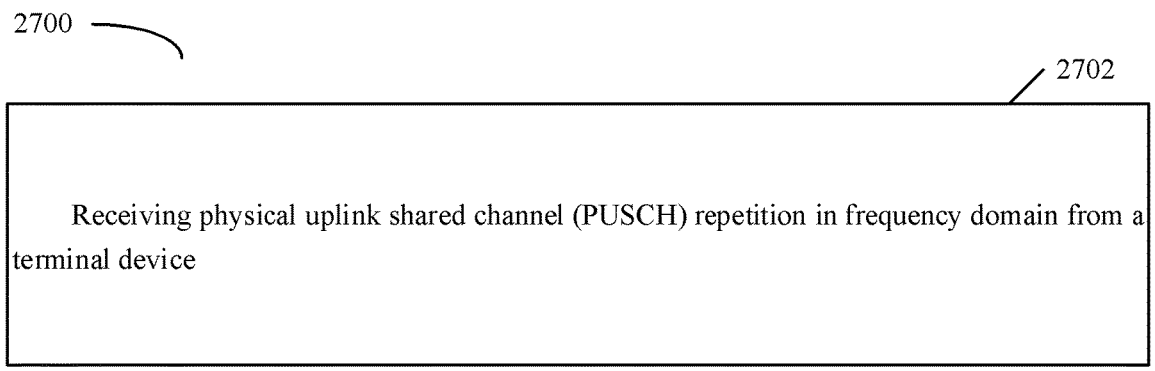
FIG. 27a shows a flowchart of a method according to an embodiment of the present disclosure.

FIG. 27a shows a flowchart of a method 2700 according to an embodiment of the present disclosure, which may be performed by an apparatus implemented in or at or communicatively coupled to a network node or any other entity having similar functionality. As such, the network node may provide means or modules for accomplishing various parts of the method 2700 as well as means or modules for accomplishing other processes in conjunction with other components. For some parts which have been described in the above embodiments, detailed description thereof is omitted here for brevity.

At block 2702, the network node receives physical uplink shared channel (PUSCH) repetition in frequency domain from a terminal device.

FIG. 27b shows a flowchart of a method 2710 according to an embodiment of the present disclosure, which may be performed by an apparatus implemented in or at or communicatively coupled to a network node or any other entity having similar functionality. As such, the network node may provide means or modules for accomplishing various parts of the method 2710 as well as means or modules for accomplishing other processes in conjunction with other components. For some parts which have been described in the above embodiments, detailed description thereof is omitted here for brevity.

In this embodiment, a set of information bits of the PUSCH are mapped to a plurality of subbands and the plurality of subbands occupies a same Orthogonal Frequency-Division Multiple (OFDM) symbol.

At block 2712, the network node receives ability information from a terminal device. The ability information indicates the terminal device transmitting the PUSCH on the subbands in the symbol by one of: a) transmitting the PUSCH using a first Demodulation Reference Signal (DMRS) port other than port 0 and b) transmitting a first random access channel preamble that is associated with the physical channel being transmitted on the plurality of subbands in the same OFDM symbol.

FIG. 28 shows a flowchart of a method 2800 according to an embodiment of the present disclosure, which may be performed by an apparatus implemented in or at or communicatively coupled to a network node or any other entity having similar functionality. As such, the network node may provide means or modules for accomplishing various parts of the method 2800 as well as means or modules for accomplishing other processes in conjunction with other components. For some parts which have been described in the above embodiments, detailed description thereof is omitted here for brevity.

At block 2802, the network node receives physical uplink shared channel (PUSCH) repetition in spatial domain from a terminal device.

Figure 29:
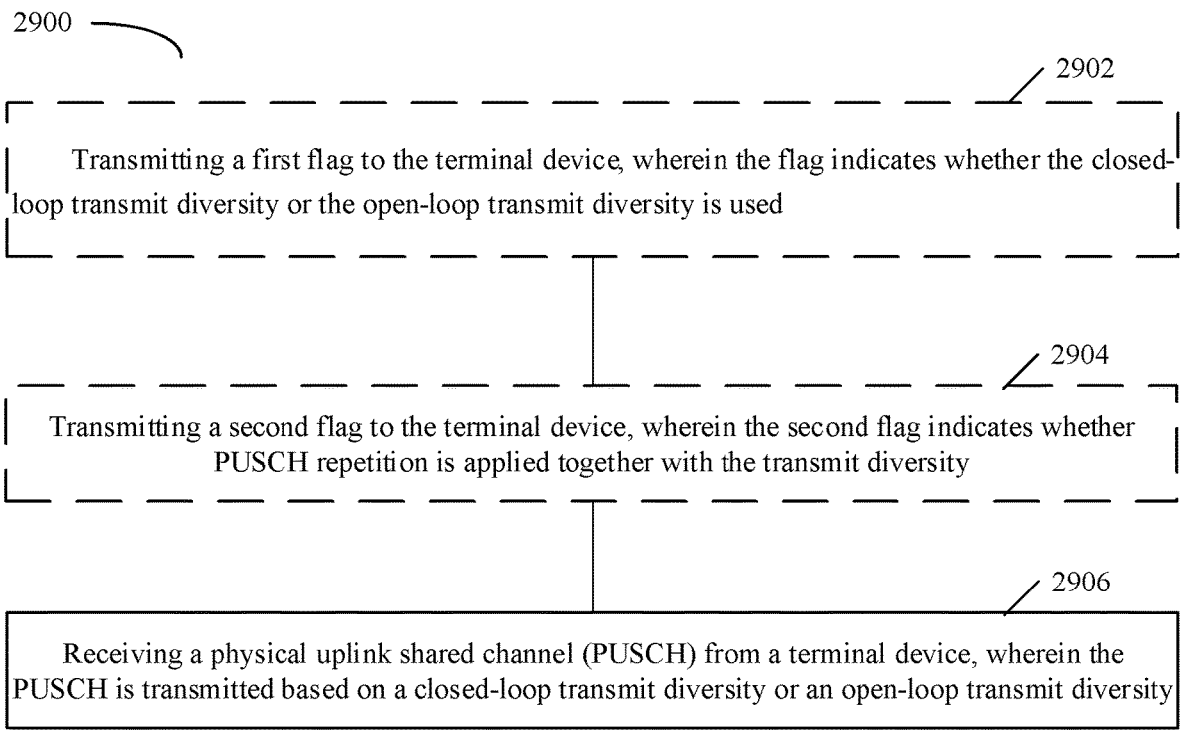
FIG. 29 shows a flowchart of a method according to an embodiment of the present disclosure.

FIG. 29 shows a flowchart of a method 2900 according to an embodiment of the present disclosure, which may be performed by an apparatus implemented in or at or communicatively coupled to a network node or any other entity having similar functionality. As such, the network node may provide means or modules for accomplishing various parts of the method 2900 as well as means or modules for accomplishing other processes in conjunction with other components. For some parts which have been described in the above embodiments, detailed description thereof is omitted here for brevity.

At block 2902, optionally, the network node transmits a first flag to the terminal device, wherein the flag indicates whether the closed-loop transmit diversity or the open-loop transmit diversity is used.

At block 2904, optionally, the network node transmits a second flag to the terminal device. The second flag indicates whether PUSCH repetition is applied together with the transmit diversity.

At block 2906, the network node receives a physical uplink shared channel (PUSCH) from a terminal device, wherein the PUSCH is transmitted based on a closed-loop transmit diversity or an open-loop transmit diversity.

Figure 30:
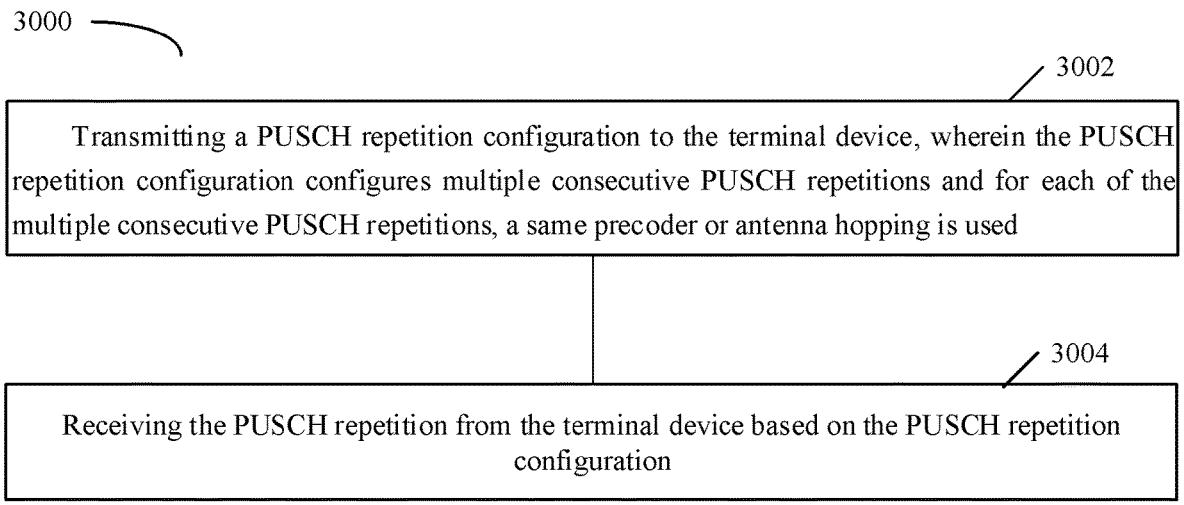
FIG. 30 shows a flowchart of a method according to an embodiment of the present disclosure.

FIG. 30 shows a flowchart of a method 3000 according to an embodiment of the present disclosure. For some parts which have been described in the above embodiments, detailed description thereof is omitted here for brevity.

At block 3002, the network node transmits a PUSCH repetition configuration to the terminal device, wherein the PUSCH repetition configuration configures multiple consecutive PUSCH repetitions and for each of the multiple consecutive PUSCH repetitions, a same precoder or antenna hopping is used.

At block 3004, the network node receives the PUSCH repetition from the terminal device based on the PUSCH repetition configuration.

Figure 31:
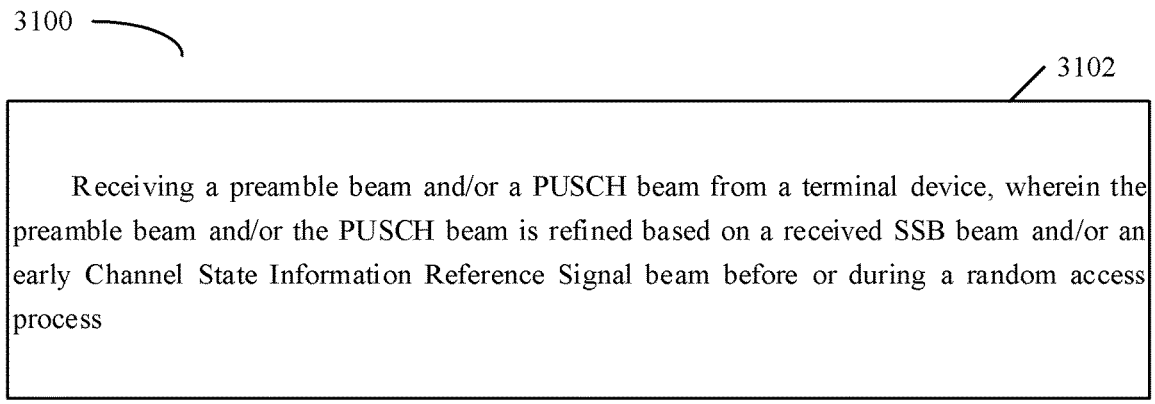
FIG. 31 shows a flowchart of a method according to an embodiment of the present disclosure.

FIG. 31 shows a flowchart of a method 3100 according to an embodiment of the present disclosure, which may be performed by an apparatus implemented in or at or communicatively coupled to a network node or any other entity having similar functionality. As such, the network node may provide means or modules for accomplishing various parts of the method 3100 as well as means or modules for accomplishing other processes in conjunction with other components. For some parts which have been described in the above embodiments, detailed description thereof is omitted here for brevity.

At block 3102, the network node receives a preamble beam and/or a PUSCH beam from a terminal device, wherein the preamble beam and/or the PUSCH beam is refined based on a received SSB beam and/or an early Channel State Information Reference Signal beam before or during a random access process.

Figure 32:
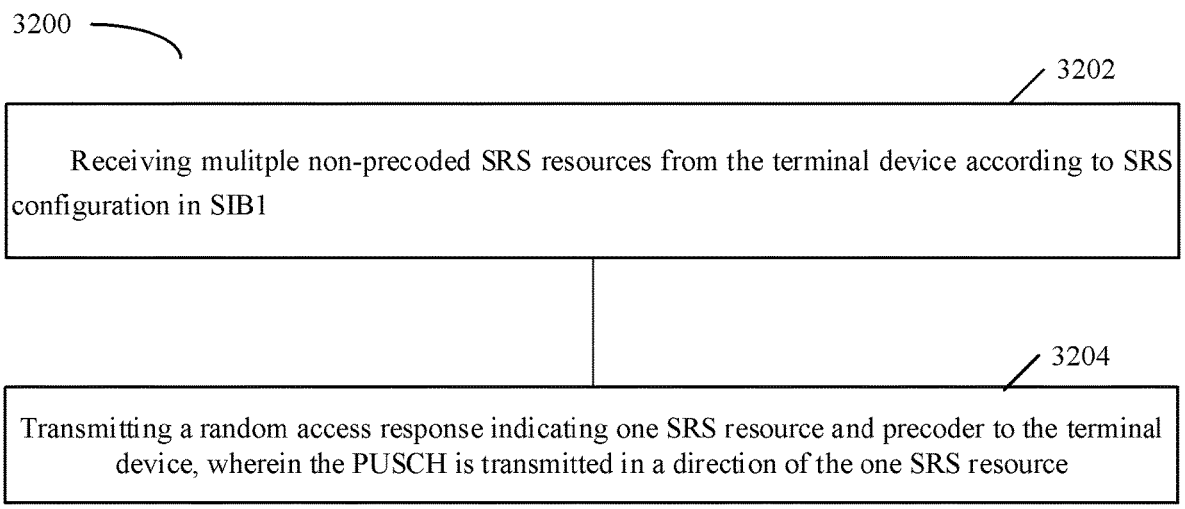
FIG. 32 shows a flowchart of a method according to an embodiment of the present disclosure.

FIG. 32 shows a flowchart of a method 3200 according to an embodiment of the present disclosure. For some parts which have been described in the above embodiments, detailed description thereof is omitted here for brevity.

At block 3202, the network node receives multiple non-precoded SRS resources from the terminal device according to SRS configuration in SIB1.

At block 3204, the network node transmits a random access response indicating one SRS resource and precoder to the terminal device. The PUSCH is transmitted in a direction of the one SRS resource.

Figure 33:
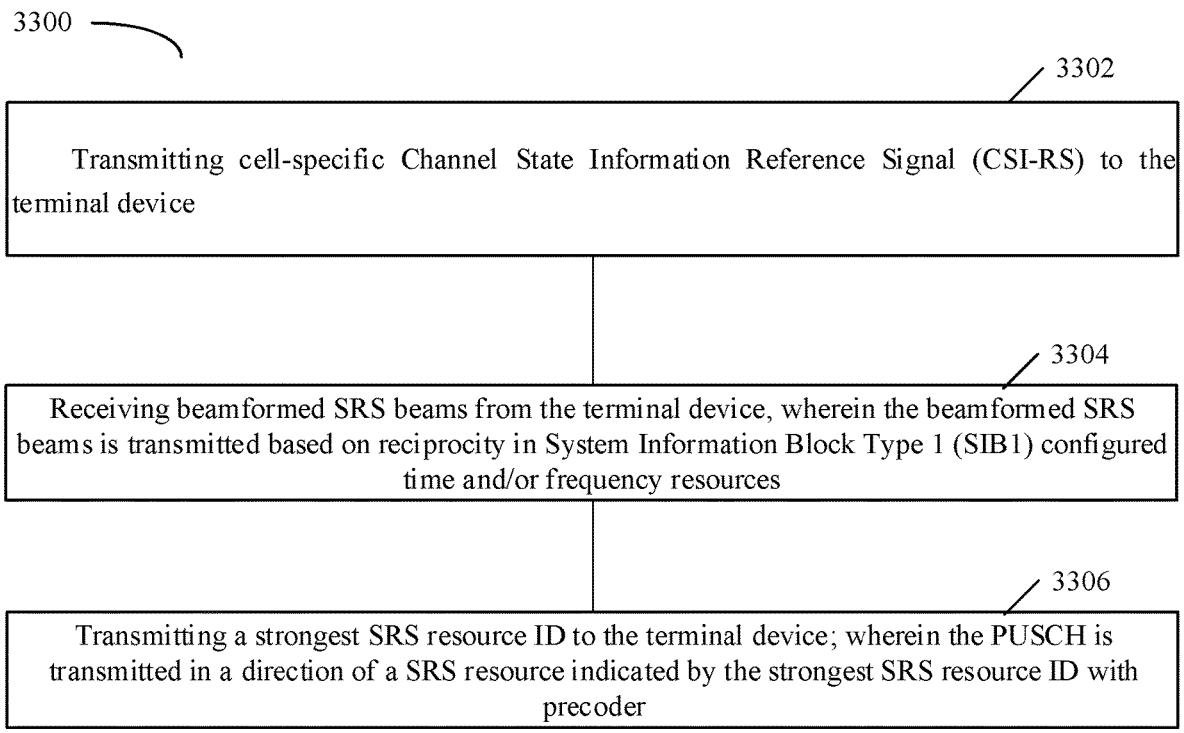
FIG. 33 shows a flowchart of a method according to an embodiment of the present disclosure.

FIG. 33 shows a flowchart of a method 3300 according to an embodiment of the present disclosure. For some parts which have been described in the above embodiments, detailed description thereof is omitted here for brevity.

At block 3302, the network node transmits cell-specific Channel State Information Reference Signal (CSI-RS) to the terminal device.

At block 3304, the network node receives beamformed SRS beams from the terminal device, wherein the beamformed SRS beams is transmitted based on reciprocity in System Information Block Type 1 (SIB1) configured time and/or frequency resources.

At block 3306, the network node transmits a strongest SRS resource ID to the terminal device. The PUSCH is transmitted in a direction of a SRS resource indicated by the strongest SRS resource ID with precoder.

According to various embodiments, there is provided methods on how to improve the uplink channels in random access procedure, covering following techniques:
  Tx diversity
  Frequency domain repetition
  Spatial domain repetition
  Beam refinement.
  Early SRS Embodiments herein afford many advantages, of which a non-exhaustive list of examples follows. Some embodiments herein may improve uplink channel coverage performance during the random access procedure in a resource efficient manner, which thereby improves the whole network (such as NR) performance. The embodiments herein are not limited to the features and advantages mentioned above. A person skilled in the art will recognize additional features and advantages upon reading the following detailed description.

Figure 34:
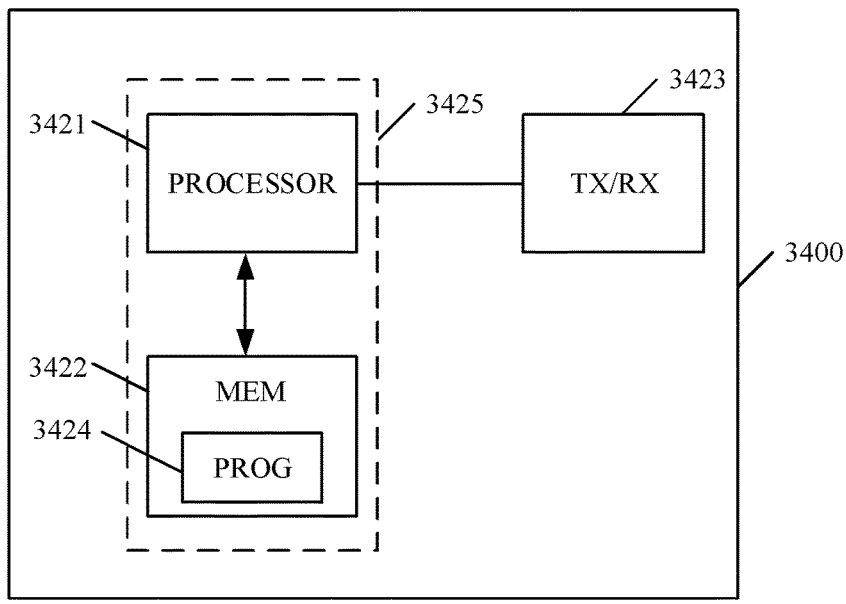
FIG. 34 is a block diagram showing an apparatus suitable for use in practicing some embodiments of the disclosure.

FIG. 34 is a block diagram showing an apparatus suitable for use in practicing some embodiments of the disclosure. For example, any one of the terminal device and the network node described above may be implemented through the apparatus 3400.

The apparatus 3400 comprises at least one processor 3421, such as a DP, and at least one MEM 3422 coupled to the processor 3421. The apparatus 3420 may further comprise a transmitter TX and receiver RX 3423 coupled to the processor 3421. The MEM 3422 stores a PROG 3424. The PROG 3424 may include instructions that, when executed on the associated processor 3421, enable the apparatus 3420 to operate in accordance with the embodiments of the present disclosure. A combination of the at least one processor 3421 and the at least one MEM 3422 may form processing means 3425 adapted to implement various embodiments of the present disclosure.

Various embodiments of the present disclosure may be implemented by computer program executable by one or more of the processor 3421, software, firmware, hardware or in a combination thereof.

The MEM 3422 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 3421 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the terminal device, the memory 3422 contains instructions executable by the processor 3421, whereby the terminal device operates according to any step of any of the methods related to the terminal device as described above.

In an embodiment where the apparatus is implemented as or at the network node, the memory 3422 contains instructions executable by the processor 3421, whereby the network node operates according to any step of any of the methods related to the network node as described above.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the terminal device and the network node may not need a fixed processor or memory. The introduction of virtualization technology and network computing technology may improve the usage efficiency of the network resources and the flexibility of the network.

Further, the exemplary overall commutation system including the terminal device and the network node such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned network node, and/or the terminal device is above mentioned terminal device.

In embodiments of the present disclosure, the processing circuitry of the host computer is configured to execute a host application. The terminal device is configured to execute a client application associated with the host application, thereby providing the user data to be received by the host computer.

Figure 35:
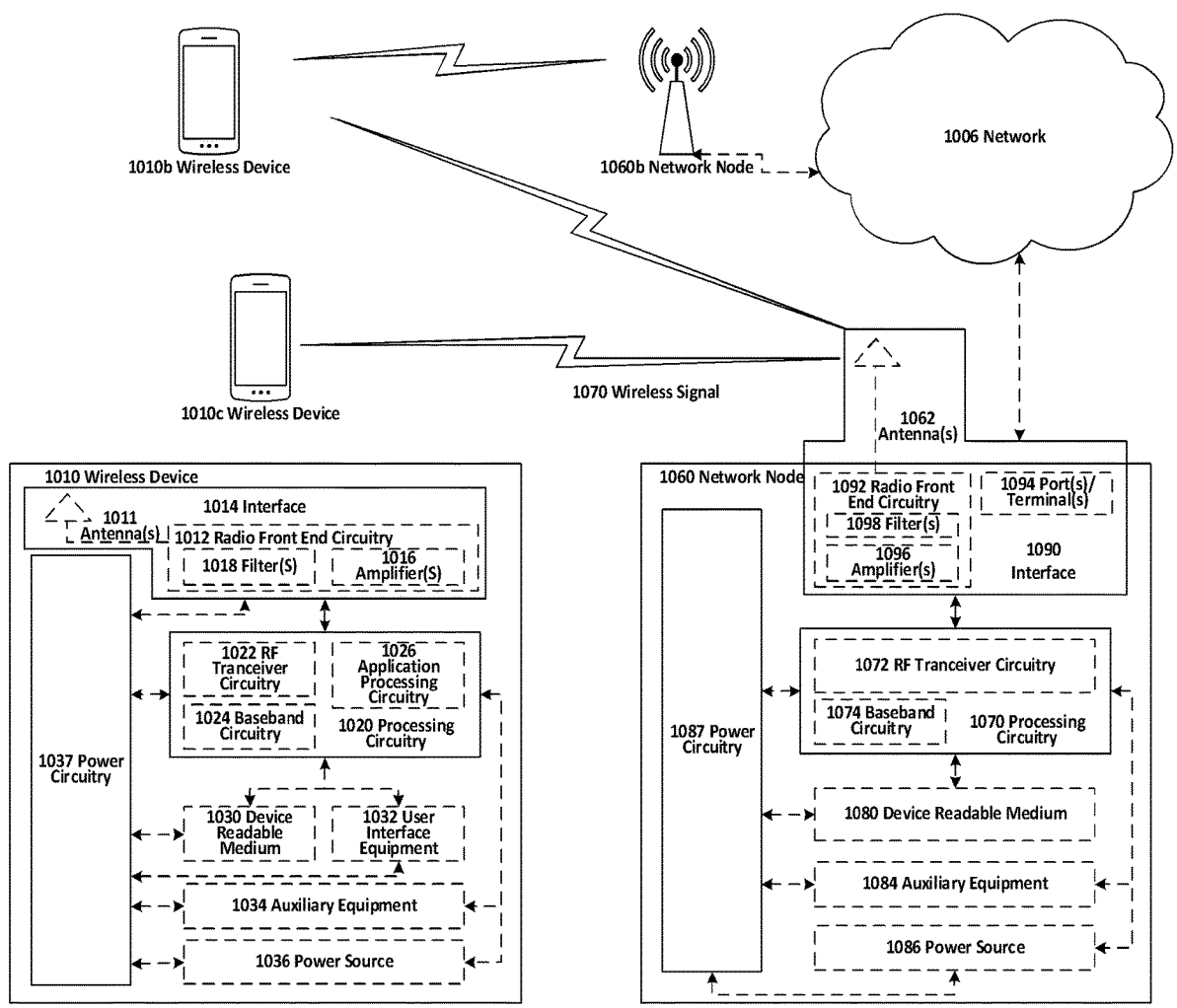
FIG. 35 is a schematic showing a wireless network in accordance with some embodiments.

FIG. 35 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 35. For simplicity, the wireless network of FIG. 35 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 35, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 35 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being executed by a network node. Any information, data and/or signals may be received from a wireless device, another network node and/or any other network equipment. Similarly, antenna 1062, interface 1090, and/or processing circuitry 1070 may be configured to perform any transmitting operations described herein as being executed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 35 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being executed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being executed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being executed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 36:
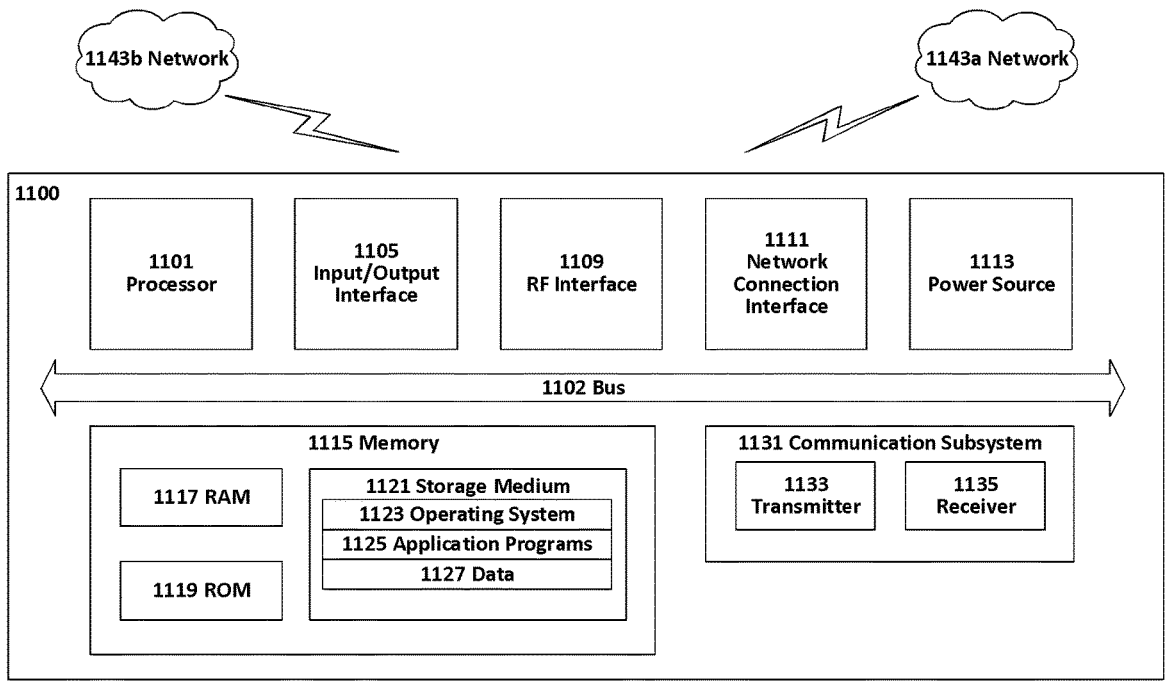
FIG. 36 is a schematic showing a user equipment in accordance with some embodiments.

FIG. 36 is a schematic showing a user equipment in accordance with some embodiments.

FIG. 36 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 36, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 36 is a UE, the components discussed herein are equally applicable to a WD, and vice-versa.

In FIG. 36, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 36, or only a subset of the components. The level of integration between the components may vary from one UE to another UE. Further, certain UEs may contain multiple instances of a component, such as multiple processors, memories, transceivers, transmitters, receivers, etc.

In FIG. 36, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 36, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 36, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 37:
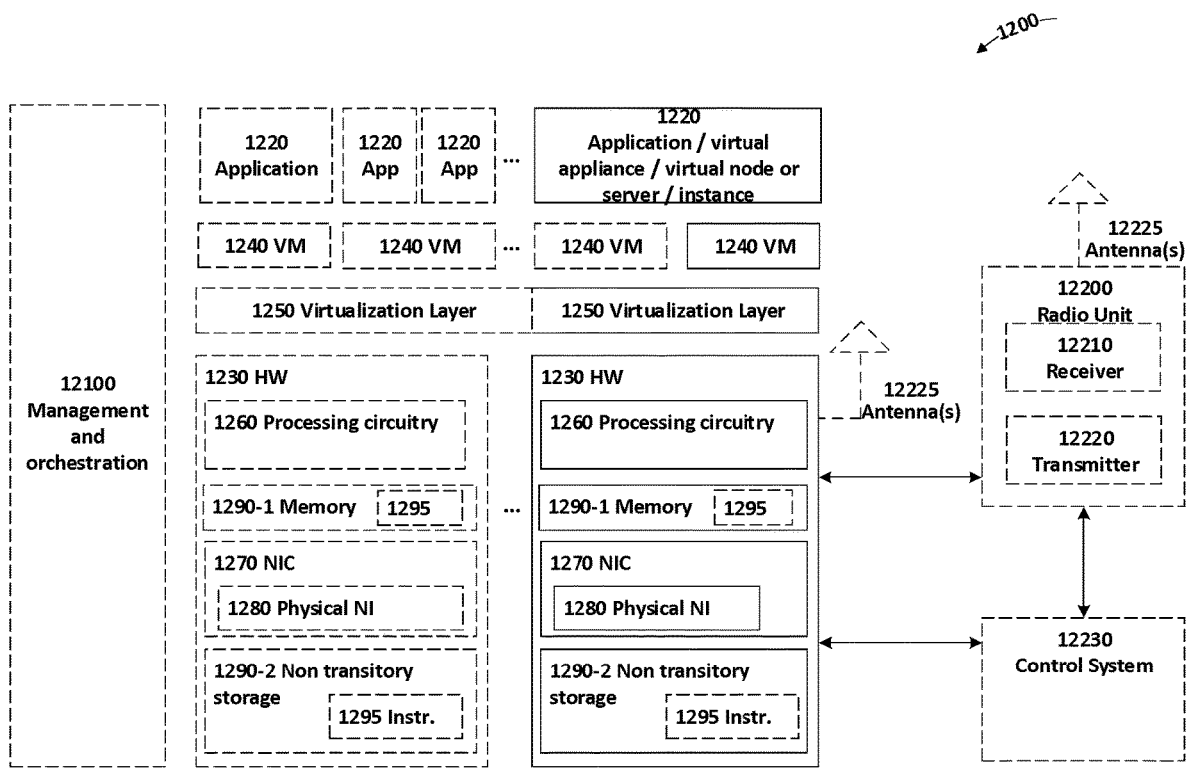
FIG. 37 is a schematic showing a virtualization environment in accordance with some embodiments.

FIG. 37 is a schematic showing a virtualization environment in accordance with some embodiments.

FIG. 37 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 37, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 37.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 38:
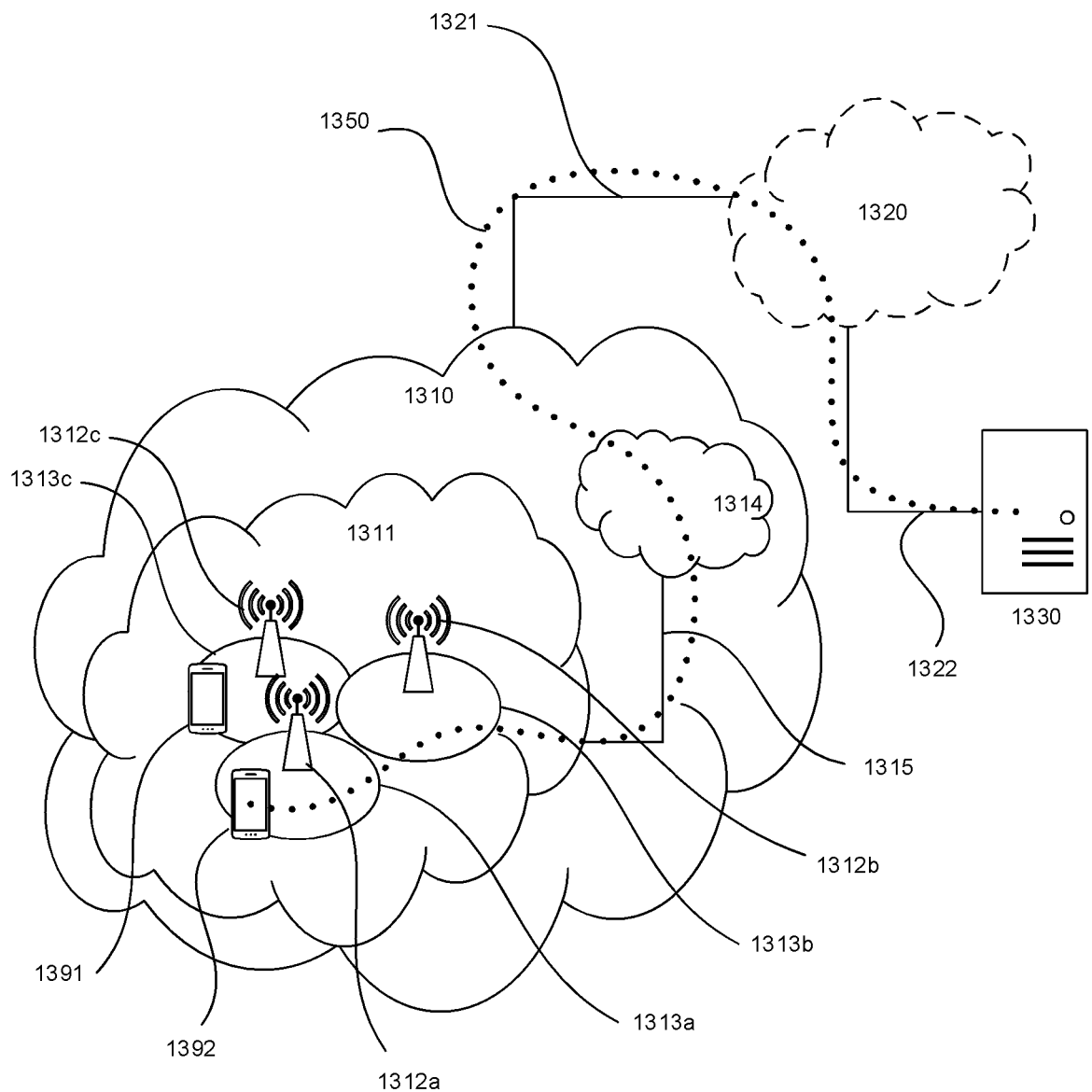
FIG. 38 is a schematic showing a telecommunication network connected via an intermediate network to a host computer in accordance with some embodiments.

FIG. 38 is a schematic showing a telecommunication network connected via an intermediate network to a host computer in accordance with some embodiments.

With reference to FIG. 38, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 38 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 39:
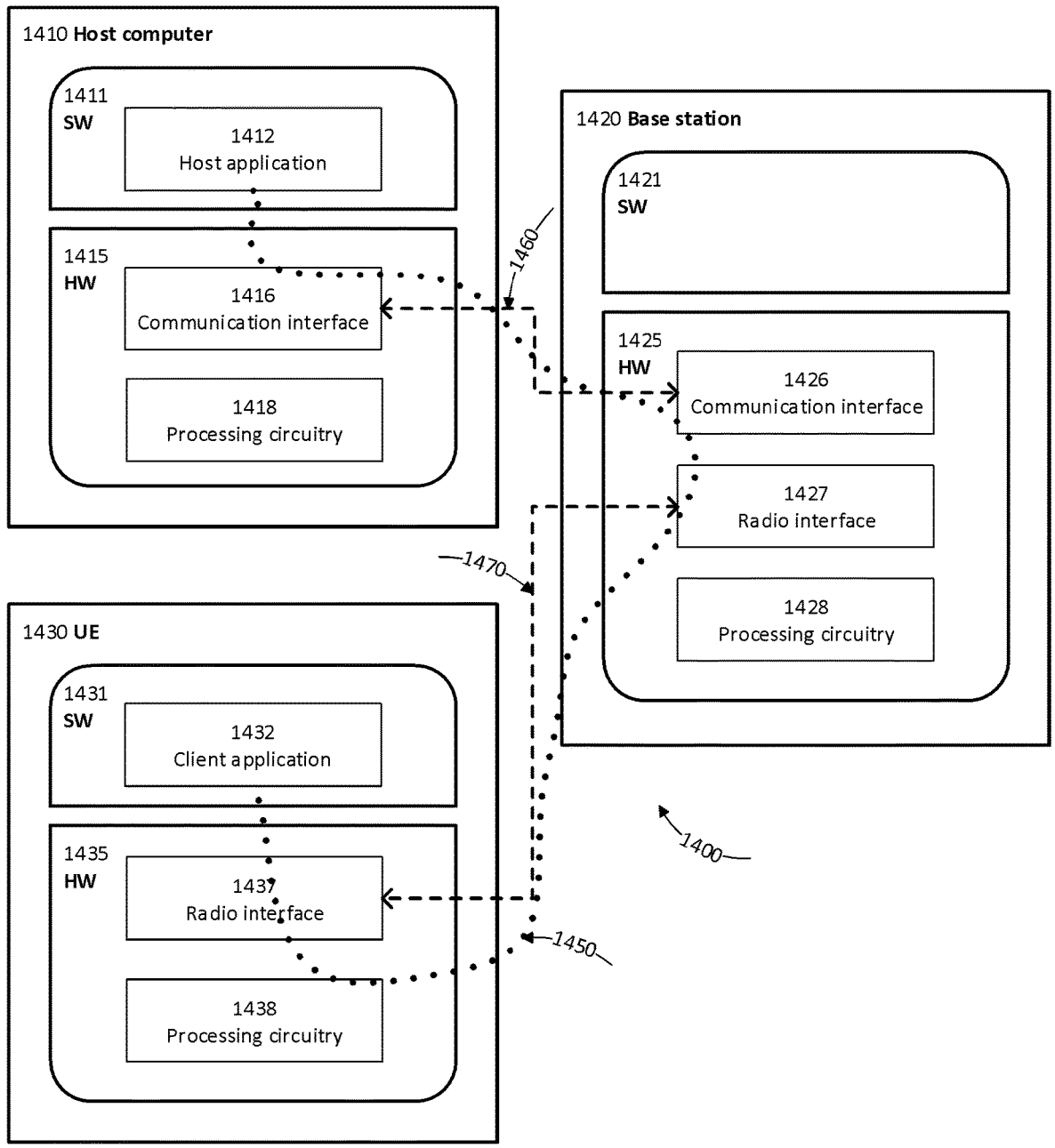
FIG. 39 is a schematic showing a host computer communicating via a base station with a user equipment over a partially wireless connection in accordance with some embodiments.

FIG. 39 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 39. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 39) served by base station 1420. Communication interface 1426 may be configured to facilitate connection 1460 to host computer 1410. Connection 1460 may be direct or it may pass through a core network (not shown in FIG. 39) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 39 may be similar or identical to host computer 1330, one of base stations 1312*a*, 1312*b*, 1312*c* and one of UEs 1391, 1392 of FIG. 38, respectively. This is to say, the inner workings of these entities may be as shown in FIG. 39 and independently, the surrounding network topology may be that of FIG. 38.

In FIG. 39, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 40:
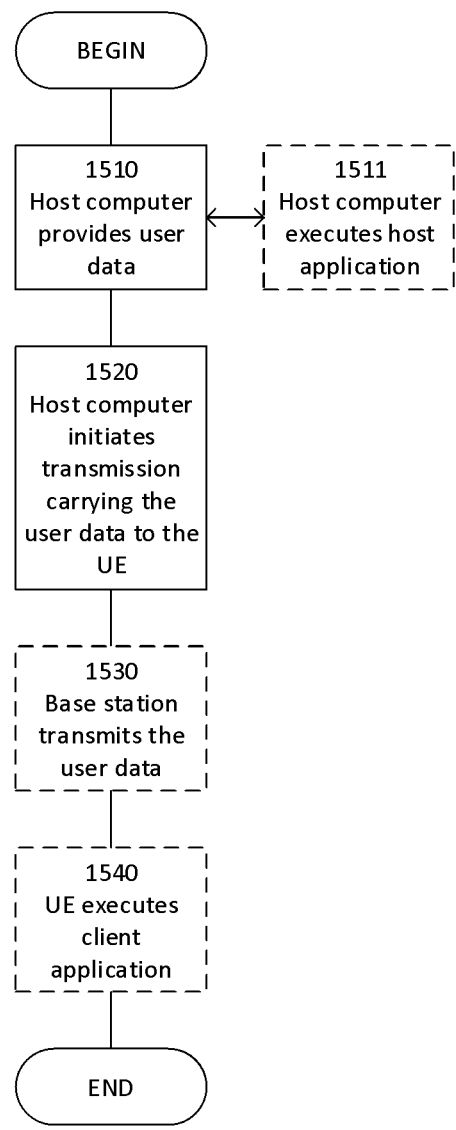
FIG. 40 is a schematic showing methods implemented in a communication system including a host computer, a base station and a user equipment in accordance with some embodiments.

FIG. 40 is a schematic showing methods implemented in a communication system including a host computer, a base station and a user equipment in accordance with some embodiments.

FIG. 40 is a flowchart illustrating a method implemented in a communication system, in accordance with one embodiment. The communication system includes a host computer, a base station and a UE which may be those described with reference to FIGS. 38 and 39. For simplicity of the present disclosure, only drawing references to FIG. 40 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 41:
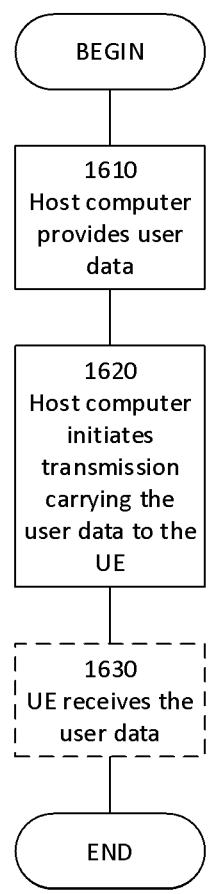
FIG. 41 is a schematic showing methods implemented in a communication system including a host computer, a base station and a user equipment in accordance with some embodiments.

FIG. 41 is a schematic showing methods implemented in a communication system including a host computer, a base station and a user equipment in accordance with some embodiments.

FIG. 41 is a flowchart illustrating a method implemented in a communication system, in accordance with one embodiment. The communication system includes a host computer, a base station and a UE which may be those described with reference to FIGS. 38 and 39. For simplicity of the present disclosure, only drawing references to FIG. 41 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 42:
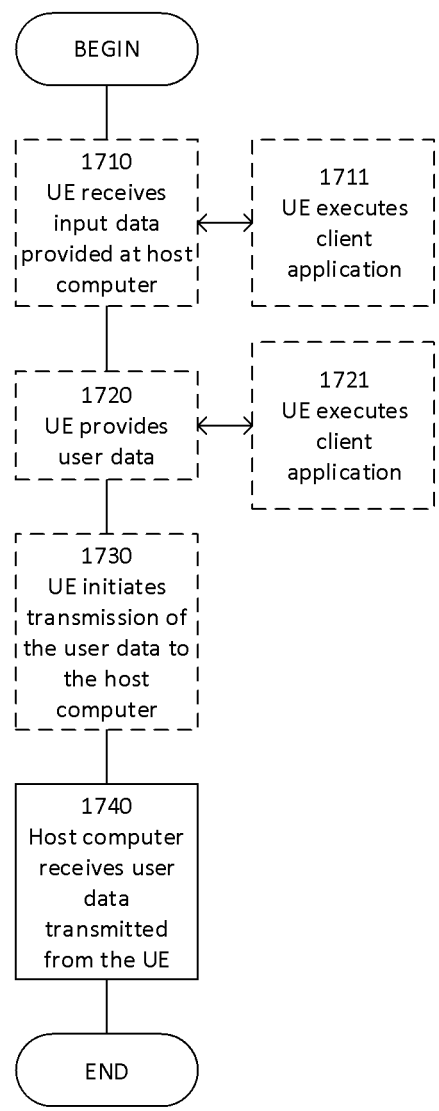
FIG. 42 is a schematic showing methods implemented in a communication system including a host computer, a base station and a user equipment in accordance with some embodiments.

FIG. 42 is a schematic showing methods implemented in a communication system including a host computer, a base station and a user equipment in accordance with some embodiments.

FIG. 42 is a flowchart illustrating a method implemented in a communication system, in accordance with one embodiment. The communication system includes a host computer, a base station and a UE which may be those described with reference to FIGS. 38 and 393. For simplicity of the present disclosure, only drawing references to FIG. 42 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 43 is a schematic showing methods implemented in a communication system including a host computer, a base station and a user equipment in accordance with some embodiments.

FIG. 43 is a flowchart illustrating a method implemented in a communication system, in accordance with one embodiment. The communication system includes a host computer, a base station and a UE which may be those described with reference to FIGS. 38 and 39. For simplicity of the present disclosure, only drawing references to FIG. 43 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Embodiments herein afford many advantages, of which a non-exhaustive list of examples follows. In some embodiments herein, the proposed solution can handle the colliding LBT failure detection and recovery procedures effectively. In some embodiments herein, the proposed solution can provide methods for the UE to report occurrence of consistent LBT failure in the source cell to its first network node while a handover is on-going. The UE data transmission and reception in the source cell is not interrupted or stalled by consistent LBT failure during the handover procedure. In some embodiments herein, the proposed solution is beneficial to achieve Oms interruption for the UE during a handover in unlicensed scenarios. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device configured to operate in a wireless communication system, the method comprising:
    transmitting multiple preambles on different transmission chains of the terminal device to a network node of the wireless communication system, wherein the multiple preambles are associated with a same synchronization signal and physical broadcast channel block (SSB) or with different SSBs, and wherein at least one of the following applies:
        the multiple preambles are transmitted at a same power level;
        each of the multiple preambles is transmitted using a different spatial domain transmission filter; and
        the multiple preambles are transmitted based on a channel quality measure being greater than a threshold.

2. The method according to claim 1, wherein the multiple preambles are associated with a best SSB detected by the terminal device and are transmitted in different directions using the respective transmission chains.

3. The method according to claim 1, wherein one of the following applies:
    the multiple preambles are transmitted simultaneously during a single random access channel occasion (RO);
    the multiple preambles are transmitted in different time-division multiplexed ROs; or
    the multiple preambles are transmitted simultaneously in different frequency-division multiplexed ROs.

4. The method according to claim 1, wherein:
    when the multiple preambles are associated with the same SSB, the following applies:
        when one SSB maps to one random access channel occasion (RO), the multiple preambles are transmitted in the same RO;
        when one SSB maps to multiple frequency division multiplexed ROs, the multiple preambles are transmitted in a same RO or different ROs;
    and when the multiple preambles are associated with different SSBs, the following applies:
        when the different SSBs map to a same RO, the multiple preambles are transmitted in the same RO; and
        when the different SSBs map to multiple frequency division multiplexed ROs, the multiple preambles are transmitted in the multiple frequency division multiplexed ROs.

5. The method according to claim 1, wherein:
    the multiple preambles are simultaneously transmitted in the same random access channel occasion (RO) when coherent closed loop transmit diversity is used for the transmission; and
    the multiple preambles are simultaneously transmitted in different frequency division multiplexed ROs when an open loop transmit diversity or a non-coherent closed loop transmit diversity is used for the transmission.

6. The method according to claim 1, wherein at least one of the following applies:
    a set of random access channel occasions (ROs) is configured for transmission of a same preamble and each set of ROs corresponds to a different transmission chain of the terminal device;
    the multiple preambles are associated with at least two preamble identifiers (IDs) and each preamble identifier ID corresponds to a different transmission chain of the terminal device; and
    a set of scrambling sequences are used to scramble preambles and each scrambling sequence corresponds to a different transmission chain of the terminal device.

7. The method according to claim 1, wherein:
    the multiple preambles are determined based on at least one of the following: a preamble group in one random access channel occasion (RO), different ROs, or terminal coherency capability;
    consecutive ones of the multiple preambles are grouped when the terminal device requires a number of consecutive preambles to transmit; and
    the multiple preambles are divided when the non-coherent terminal device requires non-coherent, partially coherent, or fully coherent preamble transmission.

8. The method according to claim 1, wherein a preamble index from every random access channel occasion (RO) is reserved by System Information Block Type 1 (SIB1) for a terminal device.

9. The method according to claim 1, wherein the transmission of the multiple preambles is based on a mapping between the multiple preambles and respective virtual antenna ports of the terminal device.

10. The method according to claim 1, further comprising:
    receiving one or more random access responses (RARs) from the network node, wherein each random access response includes an identifier of a corresponding preamble and indicates to the terminal device to transmit a physical uplink shared channel (PUSCH); and
    transmitting the PUSCH using a same spatial domain transmission filter that was used to transmit the one or more preambles corresponding to the one or more identifiers received.

11. The method according to claim 10, further comprising, after transmitting the PUSCH, performing one or more subsequent transmissions of the PUSCH using the same spatial domain filter.

12. The method according to claim 10, wherein:
when the RAR includes or indicates a precoder, the PUSCH is transmitted using the precoder; and
when the RAR does not include or indicate a precoder, the PUSCH is transmitted using only one antenna port that was used to transmit the one or more preambles corresponding to the one or more identifiers received.

13. The method according to claim 10, wherein the RAR indicates a number of PUSCH layers and the PUSCH is transmission as a multiple-layer PUSCH transmission using the indicated number of PUSCH layers.

14. The method according to claim 10, wherein when PUSCH repetition is configured for PUSCH and the RAR includes or indicates one or more precoders, the PUSCH is transmitted in multiple PUSCH repetitions, all of which use the indicated one or more precoders.

15. The method according to claim 10, wherein at least one of the following applies:
the PUSCH is transmitted using a precoder that is predefined or configured via a System Information Block Type 1 (SIB1); and
the RAR includes or indicates a further precoder, which is used for subsequent PUSCH transmissions.

16. The method according to claim 10, wherein one of the following applies:
the preamble and the PUSCH are transmitted together as a message A in a two-step random access procedure; or
the preamble and the PUSCH are transmitted as a message 1 and message 3 respectively in a four-step random access procedure.

17. A terminal device configured to operate in a wireless communication system, the terminal device comprising:
a processor; and
a memory operably coupled to the processor and containing instructions executable by said processor, wherein execution of the instructions configures the terminal device to:
transmit multiple preambles on different transmission chains of the terminal device to a network node of the wireless communication system, wherein the multiple preambles are associated with a same synchronization signal and physical broadcast channel block (SSB) or with different SSBs, and wherein at least one of the following applies:
the multiple preambles are transmitted at a same power level;
each of the multiple preambles is transmitted using a different spatial domain transmission filter; and
the multiple preambles are transmitted based on a channel quality measure being greater than a threshold.

18. A network node, comprising:
a processor; and
a memory coupled to the processor, said memory containing instructions executable by said processor, whereby said network node is operative to:
receive multiple preambles from a terminal device, wherein the multiple preambles are associated with a same synchronization signal and physical broadcast channel block (SSB) or with different SSBs, and wherein at least one of the following applies:
the multiple preambles are transmitted by the terminal device at a same power level;
each of the multiple preambles is transmitted by the terminal device using a different spatial domain transmission filter; and
the multiple preambles are transmitted by the terminal device based on a channel quality measure being greater than a threshold.

* * * * *